US010462348B2

(12) United States Patent
Ikeda et al.

(10) Patent No.: US 10,462,348 B2
(45) Date of Patent: Oct. 29, 2019

(54) COMMUNICATION APPARATUS CAPABLE OF ESTABLISHING COMMUNICATION WITH MULTIPLE DEVICES, CONTROL METHOD THEREOF, AND STORAGE MEDIUM

(71) Applicant: CANON KABUSHIKI KAISHA, Tokyo (JP)

(72) Inventors: Kaori Ikeda, Kawasaki (JP); Yuichi Kinoshita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 15/874,067

(22) Filed: Jan. 18, 2018

(65) Prior Publication Data

US 2018/0205870 A1 Jul. 19, 2018

(30) Foreign Application Priority Data

Jan. 19, 2017 (JP) .................................. 2017-007879

(51) Int. Cl.
| | | |
|---|---|---|
| H04N 5/232 | (2006.01) | |
| H04W 76/10 | (2018.01) | |
| H04W 48/16 | (2009.01) | |
| G06F 3/0482 | (2013.01) | |
| H04W 88/08 | (2009.01) | |
| G06F 3/0484 | (2013.01) | |
| H04W 84/12 | (2009.01) | |

(52) U.S. Cl.
CPC ........ *H04N 5/23206* (2013.01); *H04W 48/16* (2013.01); *H04W 76/10* (2018.02); *G06F 3/0482* (2013.01); *G06F 3/04842* (2013.01); *H04W 84/12* (2013.01); *H04W 88/08* (2013.01)

(58) Field of Classification Search
CPC .......................... H04N 5/232; H04N 5/23206
USPC ........................................ 348/211.99–211.2
See application file for complete search history.

(56) References Cited

U.S. PATENT DOCUMENTS

2007/0265009 A1* 11/2007 Hamaguchi ......... H04M 1/7253
455/436
2008/0284855 A1* 11/2008 Umeyama .......... H04N 1/00204
348/207.1
(Continued)

FOREIGN PATENT DOCUMENTS

JP 2011-188518 A 9/2011

*Primary Examiner* — Anthony J Daniels
(74) *Attorney, Agent, or Firm* — Cowan, Liebowitz & Latman, P.C.

(57) ABSTRACT

A communication apparatus comprises a processor configured to perform the operations of following units: while the communication apparatus has joined a first network, a first receiving unit configured to receive a first signal being transmitted from a first apparatus that has joined the first network and the first signal including information pertaining to the first apparatus; a second receiving unit configured to receive a second signal including information of a second network formed by a second apparatus; and a display control unit configured to display a selection screen for selecting an apparatus with which to establish a predetermined communication, wherein the display control unit displays the information of the first apparatus and the information of the second apparatus determined to meet a predetermined condition in the selection screen as information of candidate apparatuses with which the predetermined communication may be established.

16 Claims, 15 Drawing Sheets

(56) References Cited

U.S. PATENT DOCUMENTS

| | | | |
|---|---|---|---|
| 2011/0128389 A1* | 6/2011 | Maeda | H04N 1/00204 348/207.1 |
| 2014/0082207 A1* | 3/2014 | Kikuchi | H04L 67/14 709/228 |
| 2014/0184830 A1* | 7/2014 | Eom | H04W 12/04 348/207.11 |
| 2017/0064238 A1* | 3/2017 | Kardashov | H04N 21/4223 |

* cited by examiner

F I G. 10B
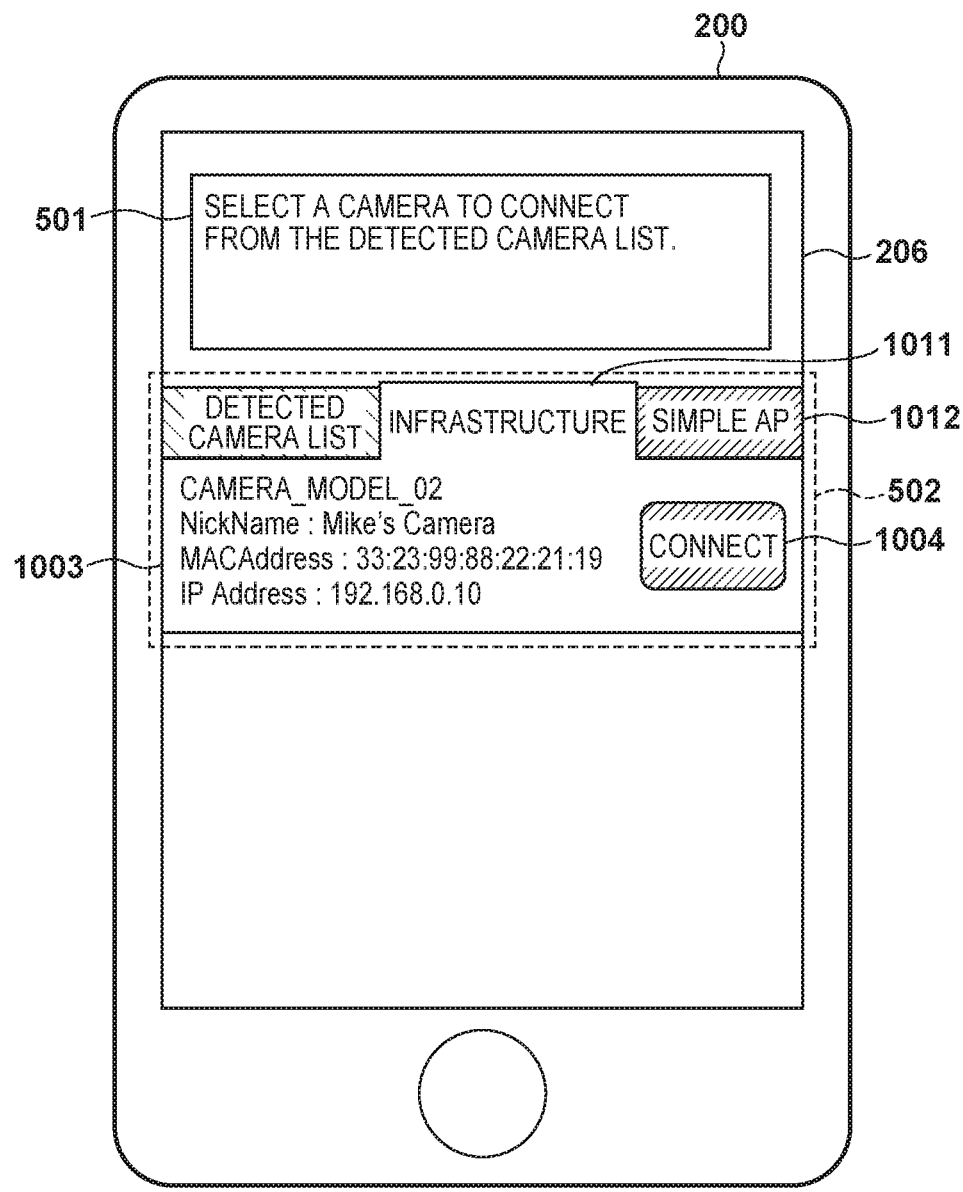

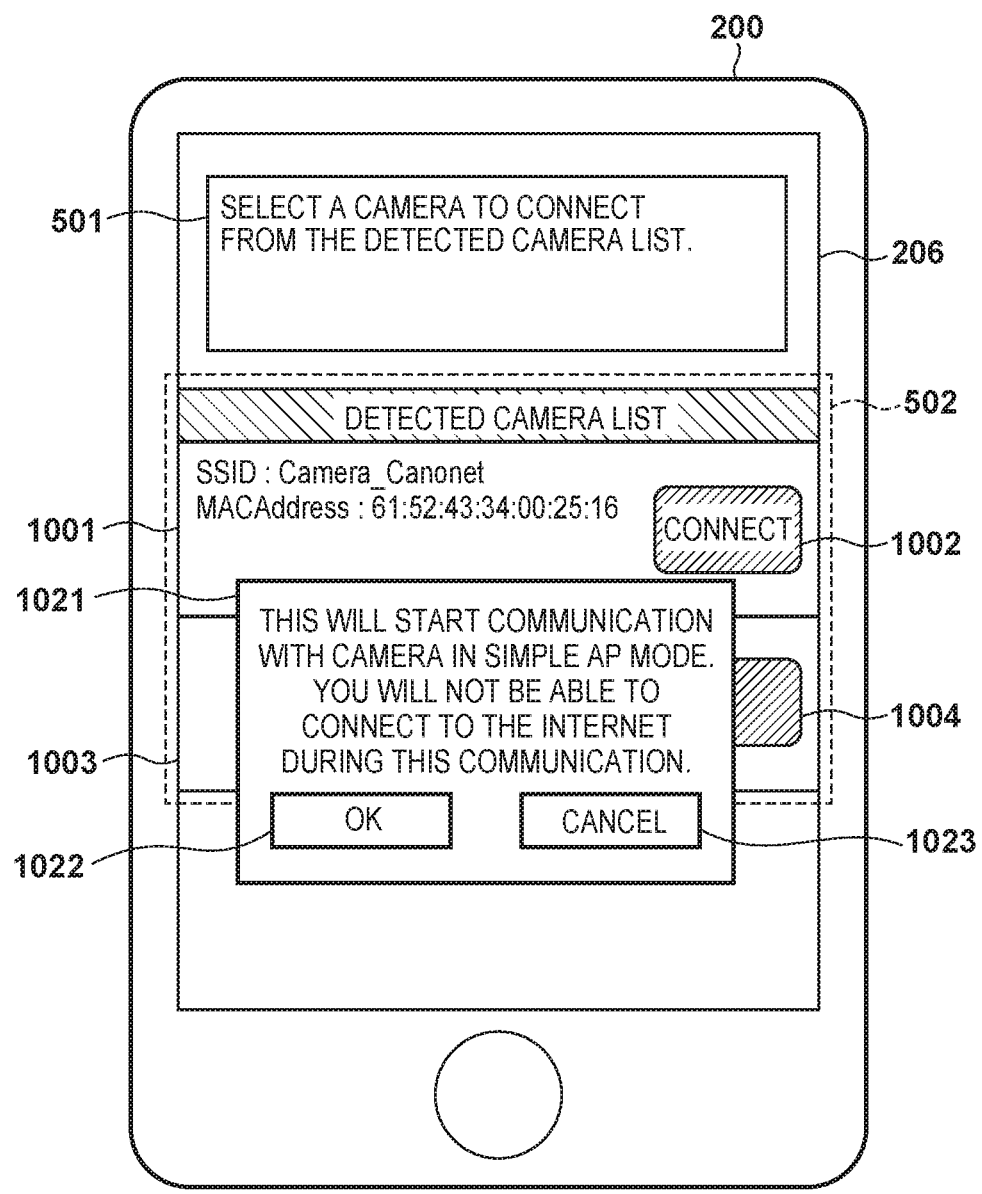

COMMUNICATION APPARATUS CAPABLE OF ESTABLISHING COMMUNICATION WITH MULTIPLE DEVICES, CONTROL METHOD THEREOF, AND STORAGE MEDIUM

BACKGROUND OF THE INVENTION

Field of the Invention

This invention relates to a communication apparatus capable of establishing communication with multiple devices, a control method thereof, and a storage medium.

Description of the Related Art

Recently, image capturing apparatuses such as digital cameras capable of communicating with communication apparatuses such as smartphones using wireless communication systems such as an IEEE 802.11-based system (a wireless LAN) are known. Using wireless communication functionality of an image capturing apparatus makes it possible to more easily exchange image data stored in the image capturing apparatus with the communication apparatus, for example. Additionally, more and more image capturing apparatuses are being provided with simple wireless LAN access point (also simply called "AP") functions. When the image capturing apparatus activates the simple AP function, a nearby communication apparatus can detect the access point provided by the image capturing apparatus and join a wireless LAN network formed by the image capturing apparatus.

When the communication apparatus starts to communicate with the image capturing apparatus, the communication apparatus first detects the Service Set Identifier (SSID) of the access point provided by the image capturing apparatus using a beacon signal, and then allows a user to select that SSID in the communication apparatus. However, if there are other wireless LAN access points nearby and the communication apparatus has detected the SSIDs of those access points, it will be difficult for the user to identify and select the SSID of the desired image capturing apparatus.

In response to the problem where it is difficult to select a desired access point, Japanese Patent Laid-Open No. 2011-188518 proposes a technique in which whether or not an access point is to provide simplified configuration such as AOSS is distinguished on the basis of the structure of the character string expressing the SSID, and a list of the access points distinguished in this manner is then displayed. By using the technique disclosed in Japanese Patent Laid-Open No. 2011-188518, a user can easily identify and select the SSID of an access point providing a simplified configuration function.

Incidentally, there are also some image capturing apparatuses that, rather than having a simple AP function, operate in infrastructure mode and join wireless LAN networks formed by outside access points. When an image capturing apparatus operates in infrastructure mode, the communication apparatus recognizes the presence of the image capturing apparatus by receiving a discovery signal from the image capturing apparatus joining the wireless LAN network, and thus that timing is the first time a user can select the image capturing apparatus.

In other words, for an image capturing apparatus operating as a simple access point as described in the above example, the communication apparatus must use the method of detecting the image capturing apparatus using a beacon signal, whereas for an image capturing apparatus operating in infrastructure mode, the communication apparatus must use a method of detecting the image capturing apparatus using a discovery signal; furthermore, the communication apparatus must then establish communication through those different methods. In such a case, where communication is established using different methods, there are situations where the communication apparatus must display separate device selection screens, which may confuse the user.

SUMMARY OF THE INVENTION

The present invention has been made in consideration of the aforementioned problems, and realizes a technique that makes it possible for multiple apparatuses detected through different methods to be displayed in a unified manner for establishing communication.

In order to solve the aforementioned problems, one aspect of the present invention provides a communication apparatus that can establish predetermined communication with another apparatus present on the same network, the communication apparatus comprising: a communication interface; and a processor configured to perform the operations of following units: while the communication apparatus has joined a first network, a first receiving unit configured to receive, via the communication interface, a first signal, the first signal being transmitted from a first external apparatus that has joined the first network and the first signal including information pertaining to the first external apparatus; a second receiving unit configured to receive, via the communication interface, a second signal, the second signal including information of a second network formed by a second external apparatus; a determining unit configured to determine whether the second external apparatus meets a predetermined condition on the basis of the information of the second network received by the second receiving unit; and a display control unit configured to display, in a display unit, a selection screen for selecting an apparatus with which to establish the predetermined communication, wherein the display control unit displays the information of the first external apparatus and the information of the second external apparatus determined to meet the predetermined condition in the selection screen as information of candidate apparatuses with which the predetermined communication may be established.

Another aspect of the present invention provides a control method of a communication apparatus that can establish predetermined communication with another apparatus present on the same network, the method comprising: while the communication apparatus has joined a first network, receiving, via the communication interface, a first signal, the first signal being transmitted from a first external apparatus that has joined the first network and the first signal including information pertaining to the first external apparatus; receiving, via the communication interface, a second signal, the second signal including information of a second network formed by a second external apparatus; determining whether the second external apparatus meets a predetermined condition on the basis of the received information of the second network; and displaying, in a display unit, a selection screen for selecting an apparatus with which to establish the predetermined communication, wherein in the step of displaying, the information of the first external apparatus and the information of the second external apparatus determined to meet the predetermined condition are displayed in the selection screen as information of candidate apparatuses with which the predetermined communication may be established.

Still another aspect of the present invention provides a non-transitory computer readable storage medium storing a program for causing a computer to execute a control method of a communication apparatus that can establish predetermined communication with another apparatus present on the same network, the method comprising: while the communication apparatus has joined a first network, receiving, via the communication interface, a first signal, the first signal being transmitted from a first external apparatus that has joined the first network and the first signal including information pertaining to the first external apparatus; receiving, via the communication interface, a second signal, the second signal including information of a second network formed by a second external apparatus; determining whether the second external apparatus meets a predetermined condition on the basis of the received information of the second network; and displaying, in a display unit, a selection screen for selecting an apparatus with which to establish the predetermined communication, wherein in the step of displaying, the information of the first external apparatus and the information of the second external apparatus determined to meet the predetermined condition are displayed in the selection screen as information of candidate apparatuses with which the predetermined communication may be established.

According to the present invention, multiple apparatuses detected through different methods can be displayed in a unified manner for establishing communication.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 10A, 10B, 10C, and 10D are diagrams schematically illustrating an example of a display screen in a smartphone according to an embodiment.

DESCRIPTION OF THE EMBODIMENTS

Configuration of Digital Camera

Figure 1:
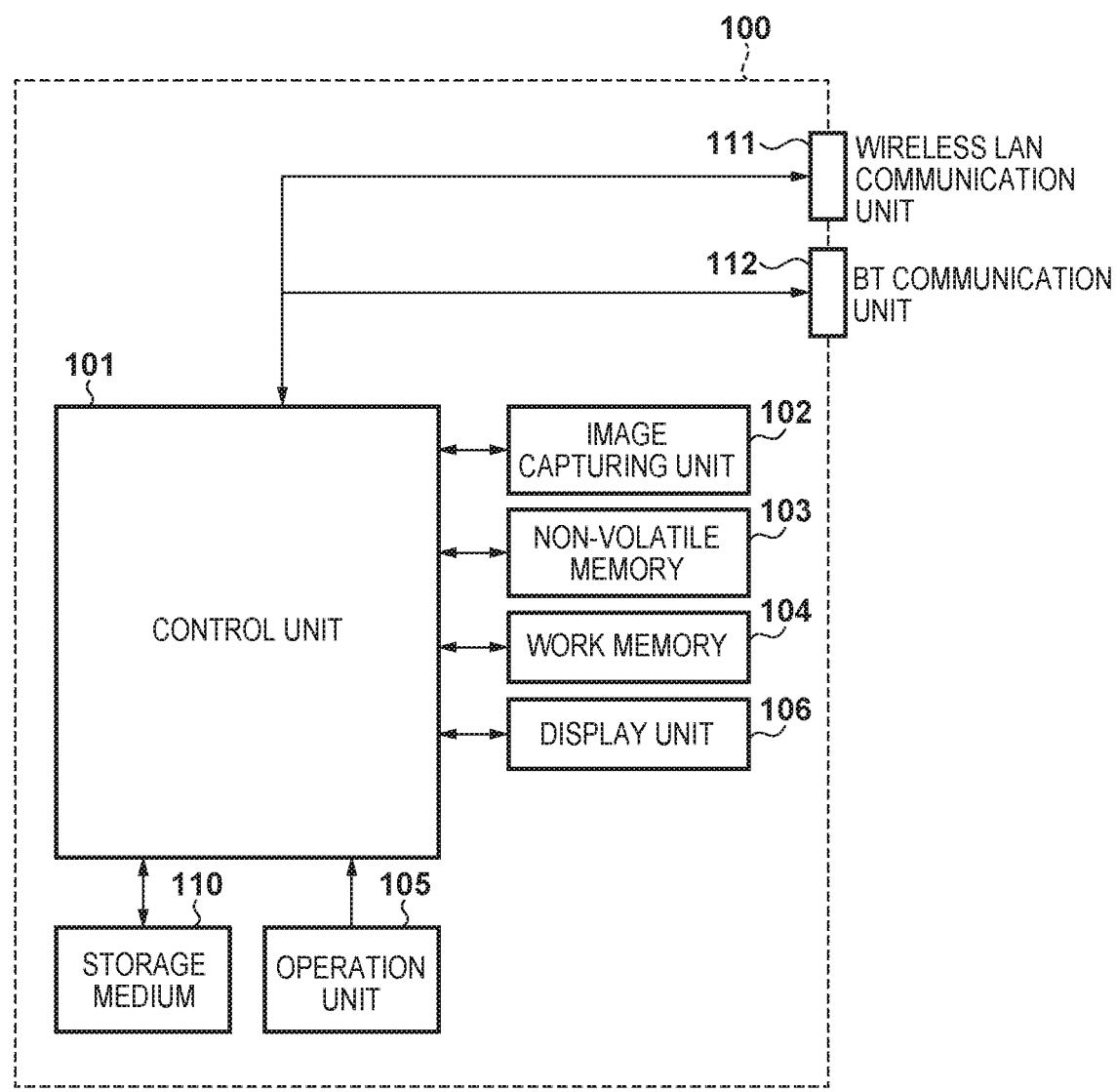
FIG. 1 is a block diagram illustrating an example of the functional configuration of a digital camera serving as an example of an image capturing apparatus according to an embodiment.

An example of the functional configuration of a digital camera 100 serving as an example of a communication apparatus according to this embodiment will be described first with reference to FIG. 1. Note that this embodiment is not limited to a digital camera, and can be applied in any apparatus capable of communicating with another apparatus. These apparatuses may include cellular phones such as smartphones, game consoles, tablet terminals, watch-type and eyeglass-type information terminals, medical devices, surveillance systems, vehicle-mounted systems, and so on, for example.

A control unit 101 includes a processor such as a CPU (or MPU), and controls the various elements of the digital camera 100 by loading programs recorded in a non-volatile memory 103 into a work memory 104 and executing those programs. Additionally, upon accepting operation instructions from a user via an operation unit 105, the control unit 101 controls the various elements on the basis of those operation instructions. Note that rather than the control unit 101 controlling the apparatus as a whole, the digital camera 100 as a whole may be controlled by splitting up processing among multiple pieces of hardware.

An image capturing unit 102 includes an optical imaging system constituted by a lens group, an aperture group, and the like, as well as an image sensor having a configuration in which multiple pixels, each having a photoelectric conversion element, are arrayed two-dimensionally. An optical image of a subject formed by the optical imaging system is converted into an electrical signal, subjected to analog-digital conversion, and output as image data. The output image data is stored in a buffer memory (described later), subjected to predetermined computations by the control unit 101, and is then recorded into a storage medium 110.

The non-volatile memory 103 includes an electrically erasable/recordable non-volatile memory, and stores various types of programs executed by the control unit 101, predetermined parameters used when executing the programs, and so on. The work memory 104 is used as a buffer memory that temporarily stores the image data captured by the image capturing unit 102, an image display memory for a display unit 106, a work region for the control unit 101, and so on.

The operation unit 105 includes operation members such as buttons, dials, switches, a touch panel, and so on that accept operation instructions for the digital camera 100 from the user. The operation unit 105 includes, for example, a power button through which the user instructs the power of the digital camera 100 to be turned on and off, a release switch for instructing a shot to be taken, a playback button for instructing image data to be played back, and so on. The operation unit 105 also includes a touch panel formed on the display unit 106, which will be described later. Note that the release switch includes SW1 and SW2. SW1 turns on when the release switch is put into a so-called half-pressed state.

When SW1 is on, the control unit 101 accepts instructions for shooting preparations such as an autofocus (AF) process, an automatic exposure (AE) process, an auto white balance (AWB) process, a flash pre-emission (EF) process, and so on. SW2 turns on when the release switch is put into a so-called fully-pressed state. When SW2 is on, the control unit 101 accepts an instruction for taking a shot.

The display unit 106 includes a display device such as a liquid crystal display, an organic EL display, electronic paper, or the like. The display unit 106 displays a viewfinder image during shooting, image data that has been shot, a GUI and text for making interactive operations, and so on. Note that the display unit 106 does not absolutely need to be built into the digital camera 100. It is sufficient for the digital camera 100 to be capable of connecting to an internal or external display unit 106 and have a display control function for controlling the display in the display unit 106.

The storage medium 110 includes a randomly-accessible storage medium constituted by semiconductor memory or the like, and records the image data output from the image capturing unit 102, for example. The storage medium 110 may be configured to be removable from the digital camera 100, or may be built into the digital camera 100. In other words, it is sufficient for the digital camera 100 to at least have access the storage medium 110.

A wireless LAN communication unit 111 includes an interface, compliant with a wireless LAN communication standard, for connecting to an external apparatus. The digital camera 100 can exchange data with the external apparatus over a wireless LAN through the wireless LAN communication unit 111. The control unit 101 realizes wireless communication with the external apparatus over wireless LAN by controlling the wireless LAN communication unit 111. Note that the digital camera 100 according to this embodiment can operate as a slave apparatus in infrastructure mode. Note that "infrastructure mode" is one wireless LAN operating mode, and refers to a mode in which apparatuses communicate with each other via an access point (also simply called an "AP"). When operating as a slave apparatus, the digital camera 100 can connect to a nearby AP and join a network formed by the AP. Additionally, the digital camera 100 according to this embodiment can also operate as a simplified AP (also simply called a "simple AP"), which is a type of AP that has more limited functionality. The AP according to this embodiment is an example of a relay apparatus. When operating as a simple AP, the digital camera 100 forms a network by itself. Apparatuses nearby the digital camera 100 can recognize the digital camera 100 as an AP and join the network formed by the digital camera 100. In other words, the digital camera 100 can directly connect to another apparatus without connecting to a separate AP.

Because the digital camera 100 according to this embodiment is a simple AP, the digital camera 100 does not have a gateway function for transferring data received from a slave apparatus to an internet provider or the like. Accordingly, even if the digital camera 100 receives data from another apparatus that has joined the network formed by the digital camera 100, that data cannot be transferred to a network such as the internet.

A BT communication unit 112 is an interface, compliant with the Bluetooth (trade name) communication standard, for connecting to an external apparatus. As with the wireless LAN communication unit 111, the digital camera 100 can exchange data with the external apparatus over Bluetooth (trade name) through the BT communication unit 112. The control unit 101 realizes wireless communication with the external apparatus through Bluetooth (trade name) by controlling the BT communication unit 112.

Configuration of Smartphone

Figure 2:
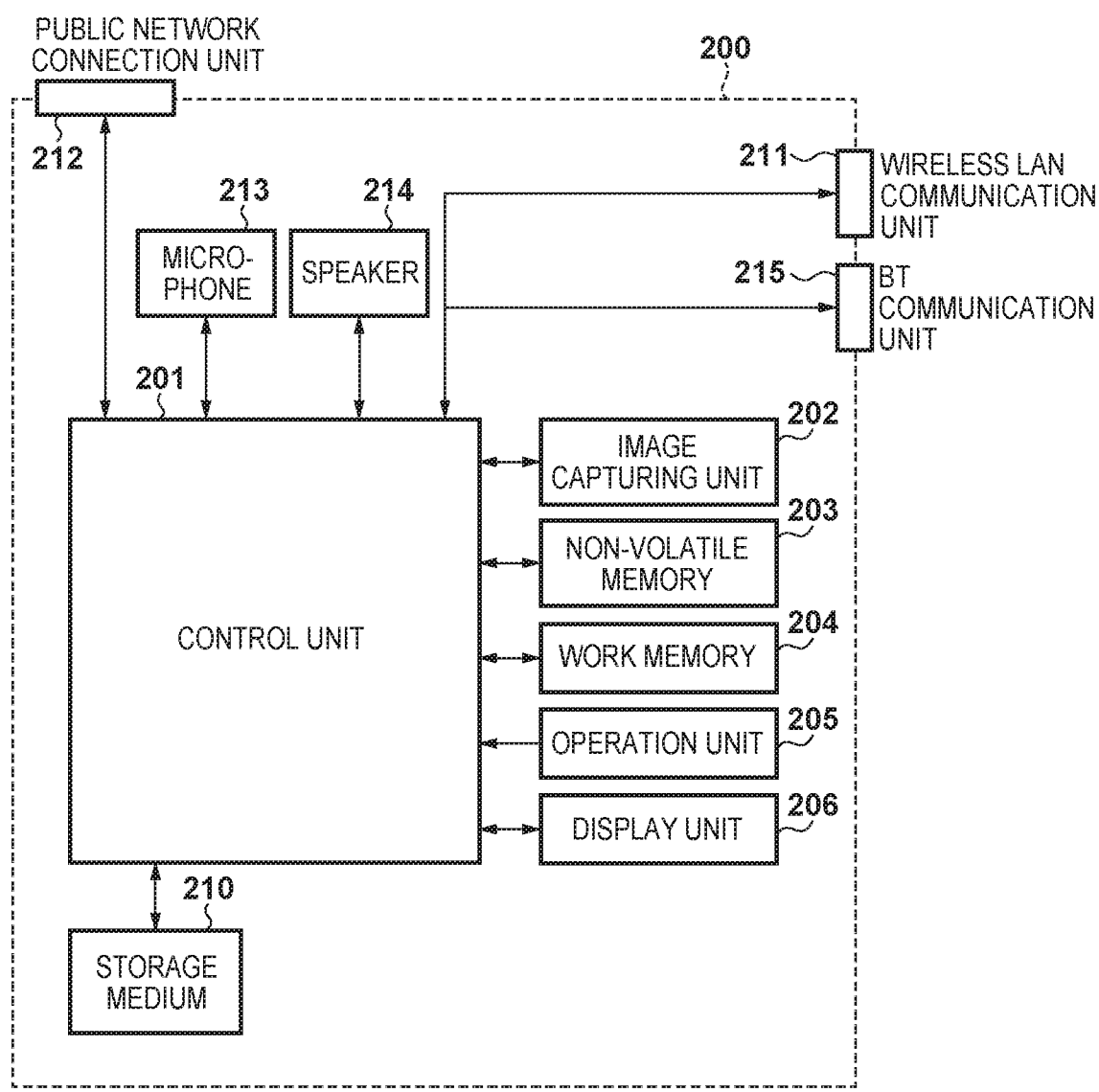
FIG. 2 is a block diagram illustrating an example of the functional configuration of a smartphone serving as an example of a communication apparatus according to the embodiment.

An example of the functional configuration of a smartphone 200 serving as an example of a communication apparatus according to this embodiment will be described next with reference to FIG. 2. Note that this embodiment is not limited to a smartphone, and can be applied in any apparatus capable of communicating with another apparatus. These apparatuses may include digital cameras, game consoles, tablet terminals, watch-type and eyeglass-type information terminals, medical devices, surveillance systems, vehicle-mounted systems, and so on, for example.

A control unit 201 includes a processor such as a CPU (or MPU), and controls the various elements of the smartphone 200 by loading programs (described later) recorded in a non-volatile memory 203 into a work memory 204 and executing those programs. Additionally, upon accepting operation instructions from a user via an operation unit 205, the control unit 201 controls the various elements on the basis of those operation instructions. Note that rather than the control unit 201 controlling the apparatus as a whole, the smartphone 200 as a whole may be controlled by splitting up processing among multiple pieces of hardware.

An image capturing unit 202 includes an optical imaging system constituted by a lens group, an aperture group, and the like, as well as an image sensor having a configuration in which multiple pixels, each having a photoelectric conversion element, are arrayed two-dimensionally. An optical image of a subject formed by the optical imaging system is converted into an electrical signal, subjected to analog-digital conversion, and output as image data. The output image data is stored in a buffer memory (described later), subjected to predetermined computations by the control unit 201, and is then recorded into a storage medium 210.

The non-volatile memory 203 includes an electrically erasable/recordable non-volatile memory, and stores various types of programs executed by the control unit 201, predetermined parameters used when executing the programs, and so on. A program for communicating with the digital camera 100, installed as a camera communication application, is also stored in the non-volatile memory 203. The processing of the smartphone 200 according to this embodiment is realized by loading programs provided by the camera communication application. Note that the camera communication application includes programs that use the basic functions of an operating system (OS) installed in the smartphone 200. The OS of the smartphone 200 may have a program for realizing the processing of the smartphone 200 according to this embodiment.

The work memory 204 is used as a buffer memory that temporarily saves the image data generated by the image capturing unit 202, an image display memory for a display unit 206, a work region for the control unit 201, and so on.

The operation unit 205 includes operation members such as buttons and a touch panel that accept operation instructions for the smartphone 200 from the user. The operation unit 205 includes, for example, a power button through which the user instructs the power of the smartphone 200 to be turned on and off, a touch panel formed on the display unit 206, and so on.

The display unit 206 includes a display device such as a liquid crystal display, an organic EL display, electronic paper, or the like. The display unit 206 displays image data, a GUI and text for making interactive operations, and so on. Note that the display unit 206 does not absolutely need to be built into the smartphone 200; it is sufficient for the smartphone 200 to be connected to the display unit 206 and have a display control function for controlling the display in the display unit 206.

The storage medium 210 includes a randomly-accessible storage medium constituted by semiconductor memory or the like, and records the image data output from the image capturing unit 202, for example. The storage medium 210 may be configured to be removable from the smartphone 200, or may be built into the smartphone 200. In other words, it is sufficient for the smartphone 200 to at least have access the storage medium 210.

A wireless LAN communication unit 211 includes an interface, compliant with a wireless LAN communication standard, for connecting to an external apparatus. The smartphone 200 can exchange data with the external apparatus over a wireless LAN through the wireless LAN communication unit 211. The control unit 201 realizes wireless communication with the external apparatus over wireless LAN by controlling the wireless LAN communication unit 211. Note that the smartphone 200 according to this embodiment can at least operate as a slave apparatus in infrastructure mode, and can join a network formed by a nearby AP.

A BT communication unit 215 is an interface, compliant with the Bluetooth (trade name) communication standard, for connecting to an external apparatus. As with the wireless LAN communication unit 211, the smartphone 200 according to this embodiment can exchange data with the external apparatus over Bluetooth (trade name) through the BT communication unit 215. The control unit 201 realizes wireless communication with the external apparatus through Bluetooth (trade name) by controlling the BT communication unit 215.

A public network connection unit 212 is an interface compliant with, for example, the WCDMA (trade name) system, used in wireless communication over a public network. The smartphone 200 can make voice calls, carry out data communication, and so on with other devices via the public network connection unit 212. When making voice calls, the control unit 201 inputs and outputs audio signals via a microphone 213 and a speaker 214. Note that the communication system is not limited to WCDMA, and other, so-called 4G communication systems, such as LTE, WiMAX, ADSL, or FTTH may be used as well. Additionally, it is not absolutely necessary for the wireless LAN communication unit 211 and the public network connection unit 212 to be configured as independent pieces of hardware; it is also possible for these units to share a single antenna, for example.

Overview of Connection Formats

Figure 3A:
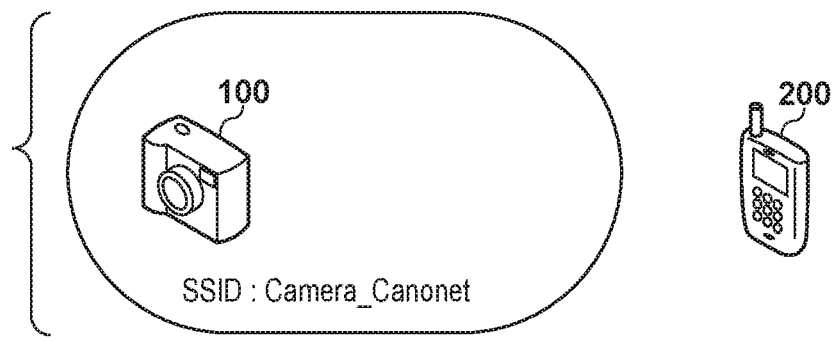
FIGS. 3A to 3D are diagrams schematically illustrating a network configuration according to the embodiment.
Figure 3B:
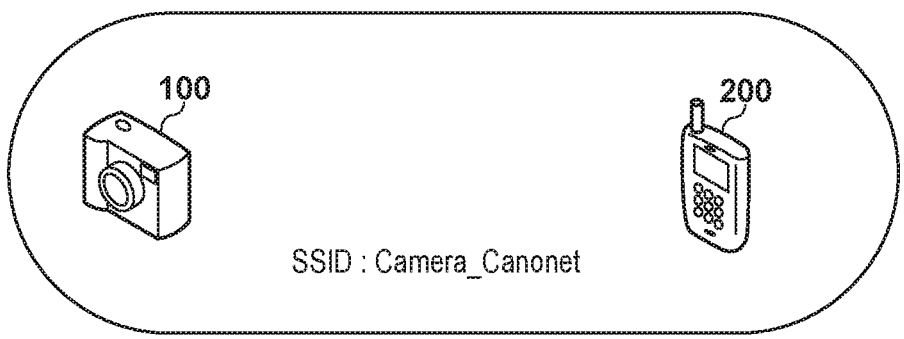

Next, an overview of connection formats between the digital camera 100 and the smartphone 200 will be described with reference to FIGS. 3A to 3D. Note the FIGS. 3A to 3D schematically illustrate connection formats and communication formats between the digital camera 100 and the smartphone 200 according to this embodiment. FIGS. 3A and 3B illustrate states arising prior to the states illustrated in FIGS. 3C and 3D, which illustrate two connection formats in which the digital camera 100 and the smartphone 200 can exchange data through wireless communication. In these drawings, the ranges indicated around the digital camera 100 and so on schematically express the ranges of networks that are formed.

First, a connection format in which the digital camera 100 and the smartphone 200 communicate directly rather than using an AP (an external relay apparatus) will be described. In this case, the digital camera 100 is in simple AP mode, operating as a simple AP and forming a wireless LAN network (also simply called a "wireless network"). FIG. 3A illustrates the state in which the digital camera 100 operates as a simple AP and forms a wireless LAN network having a wireless LAN network identifier (SSID) of "Camera_Canonet". When operating as a simple AP, the digital camera 100 starts the transmission of a periodic beacon signal.

Next, upon detecting the beacon signal transmitted from the digital camera 100, the smartphone 200 sends a request to join the wireless LAN network formed by the digital camera 100 to the digital camera 100. When the request to join is permitted by the digital camera 100, the smartphone 200 enters a state of joining the wireless LAN network formed by the digital camera 100. FIG. 3B illustrates a state in which the smartphone 200 has joined the wireless LAN network "Camera_Canonet" formed by the digital camera 100.

Figure 3C:
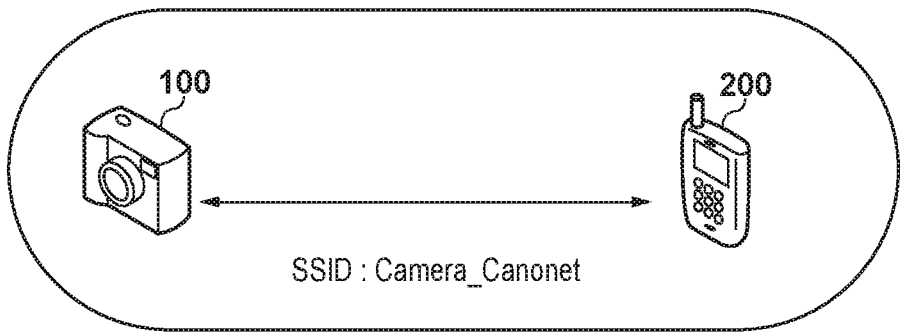

Pairing is then carried out in order to establish communication between the digital camera 100 and the smartphone 200. The digital camera 100 broadcasts, on the wireless LAN network, a discovery signal for discovering the presence of an apparatus to serve as a connection partner. This discovery signal includes device information of the digital camera 100, such as a model name of the digital camera 100, names of functions the digital camera 100 can handle, and so on. If the smartphone 200 has received the discovery signal transmitted from the digital camera 100, the smartphone 200 transmits a connection request to the digital camera 100. Upon the connection request being permitted by the digital camera 100, the digital camera 100 and the smartphone 200 enter a state of being capable of exchanging data through wireless communication (that is, communication is established). FIG. 3C illustrates a state in which communication is established between the digital camera 100 in simple AP mode and the smartphone 200.

As described earlier, the digital camera 100 according to this embodiment does not have a function for communicating with an outside network such as the internet. Accordingly, the smartphone 200 that has joined the wireless LAN network formed by the digital camera 100 cannot transmit data to the internet or the like.

Next, a connection format in which the digital camera 100 and the smartphone 200 join a wireless LAN network formed by an external AP, which is one example of an AP (an external relay apparatus), and communicate via the external AP, will be described. In this case, the digital camera 100 operates in infrastructure mode, detects a beacon signal transmitted periodically by the external AP, and joins a wireless LAN network formed by the external AP. The smartphone 200 also joins the wireless LAN network formed by the external AP in the same manner. After the digital camera 100 and the smartphone 200 have joined the same wireless LAN network, communication is established between the two by transmitting and receiving discovery signals, obtaining the above-described device information (which may include information of the capabilities of the apparatuses, service information, and so on), and the like, in the same manner as in the simple AP mode.

Figure 3D:
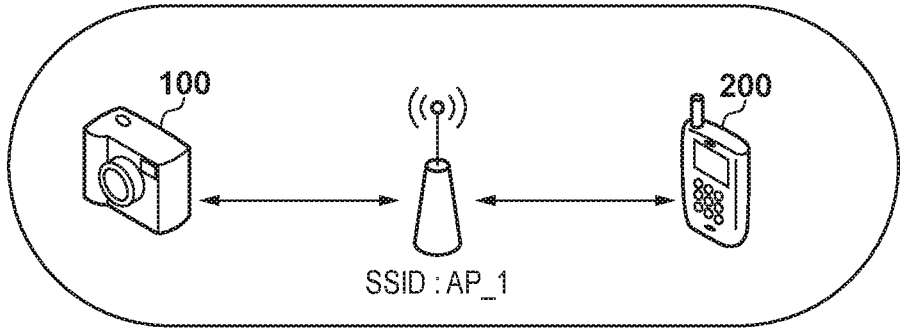

FIG. 3D illustrates a state in which communication is established between the digital camera 100 in infrastructure mode and the smartphone 200, via an external AP. In the example illustrated in FIG. 3D, the SSID of the wireless LAN network formed by the external AP is "AP_1". The external AP according to this embodiment is capable of connecting to an external network such as the internet using a public network or the like. As such, the smartphone 200 can transmit data on the internet via the external AP.

The following will describe various processes carried out when the digital camera 100 and the smartphone 200 communicate using the two above-described connection formats.

Sequence of Operations Involved in Processing Performed by Smartphone for Establishing Communication with Digital Camera in Infrastructure Mode A sequence of operations involved in processing performed by the smartphone 200 for establishing communication with the digital camera 100 in infrastructure mode (that is, via an external AP) will be described with reference to FIGS. 4A and 4B. Note that this processing is realized by the control unit 201 loading a program stored in the non-volatile memory 203 into the work memory 204 and executing the program. Unless otherwise specified, the same applies to the descriptions of other operations indicating processing performed by the smartphone 200.

Figure 4A:
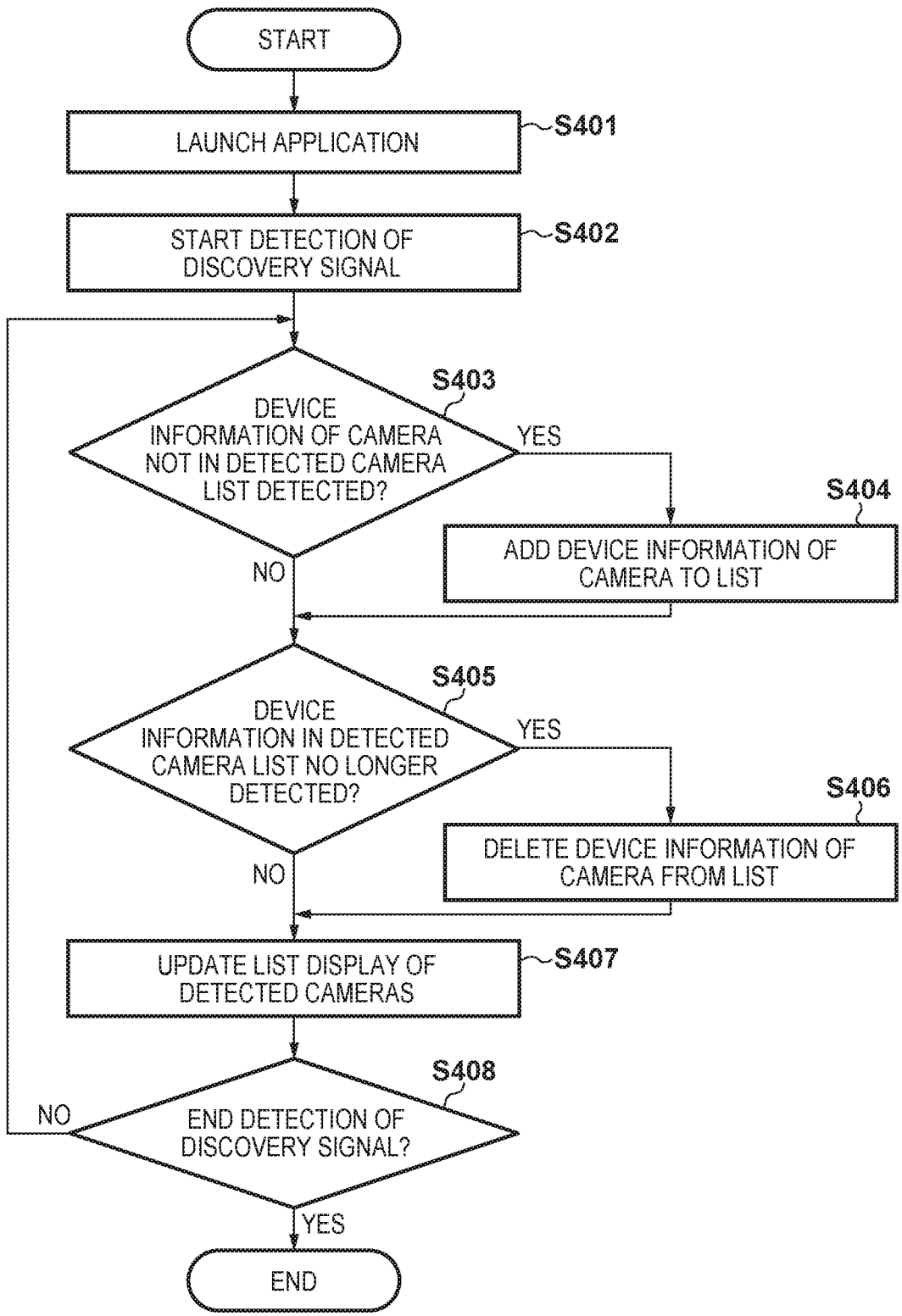
FIGS. 4A and 4B are flowcharts illustrating a sequence of operations involved in processing for establishing communication with an apparatus in infrastructure mode, carried out by the smartphone according to the embodiment.

The sequence of operations illustrated in FIG. 4A indicates operations through which the smartphone 200 and the digital camera 100, which have joined a wireless LAN network provided by the external AP, discover their partner apparatuses, and the smartphone 200 displays the detected digital camera in a list in the display unit 206. The sequence of operations involved in this processing starts when the OS of the smartphone 200 has started up, the smartphone 200 has joined the wireless LAN network, and a digital camera communication application can be launched.

In S401, the control unit 201 launches the digital camera communication application in response to an instruction to launch the digital camera communication application resulting from a user operation, after which the processing moves to S402.

In S402, the control unit 201 starts the detection of the discovery signal from the digital camera 100 by controlling the wireless LAN communication unit 211, after which the processing moves to S403. This discovery signal is broadcast from the digital camera 100 in S809, which will be described later.

In S403, the control unit 201 determines whether the device information of a digital camera not included in a detected camera list has been detected. To be more specific, first, the control unit 201 refers to device information included in discovery signals received via the wireless LAN communication unit 211. The control unit 201 then refers to a list of the device information of detected digital cameras (called a "detected camera list") stored in the work memory 204, for example, and determines whether or not the device information of the detected digital camera is present in that list. The processing moves to S404 if the control unit 201 determines that the device information of a digital camera not in the detected camera list has been detected. On the other hand, if the device information of the digital camera is in the detected camera list (or in other words, if device information not in the detected camera list has not been detected), the processing moves to S405.

In S404, the control unit 201 updates the detected camera list by adding the device information of the newly-detected digital camera to the detected camera list, after which the processing moves to S405. In S405, the control unit 201 determines whether a discovery signal from a digital camera already in the detected camera list is no longer being detected, or whether or not a device loss notification has been received. If the broadcast from the digital camera cannot be detected again, or if a device loss notification has been received, the control unit 201 determines that the device information in question is no longer detected, and the processing moves to S406. On the other hand, if the control unit 201 detects the broadcast signal from the digital camera again, the processing moves to S407.

In S406, the control unit 201 deletes, from the detected camera list, the device information of the digital camera from which a discovery signal is no longer detected or for which a device loss notification has been received in S405. The updated detected camera list is then stored in the work memory 204, and the processing moves to S407.

In S407, the control unit 201 displays or updates the list of digital cameras in the display unit 206 in accordance with the detected camera list.

In S408, the control unit 201 determines whether or not the detection of the discovery signal communicated on the wireless LAN network has ended. If the detection has ended, the control unit 201 ends the detection and display update of the discovery signal, and ends the sequence of operations illustrated in FIG. 4A. On the other hand, if the detection has not ended, the processing moves to S403, and the processes of S403 to S408 are repeated. Note that the control unit 201 ends the detection of the discovery signal if a user makes a selection to terminate the digital camera communication application, when a user has selected a digital camera to communicate with, and so on.

Figure 5:
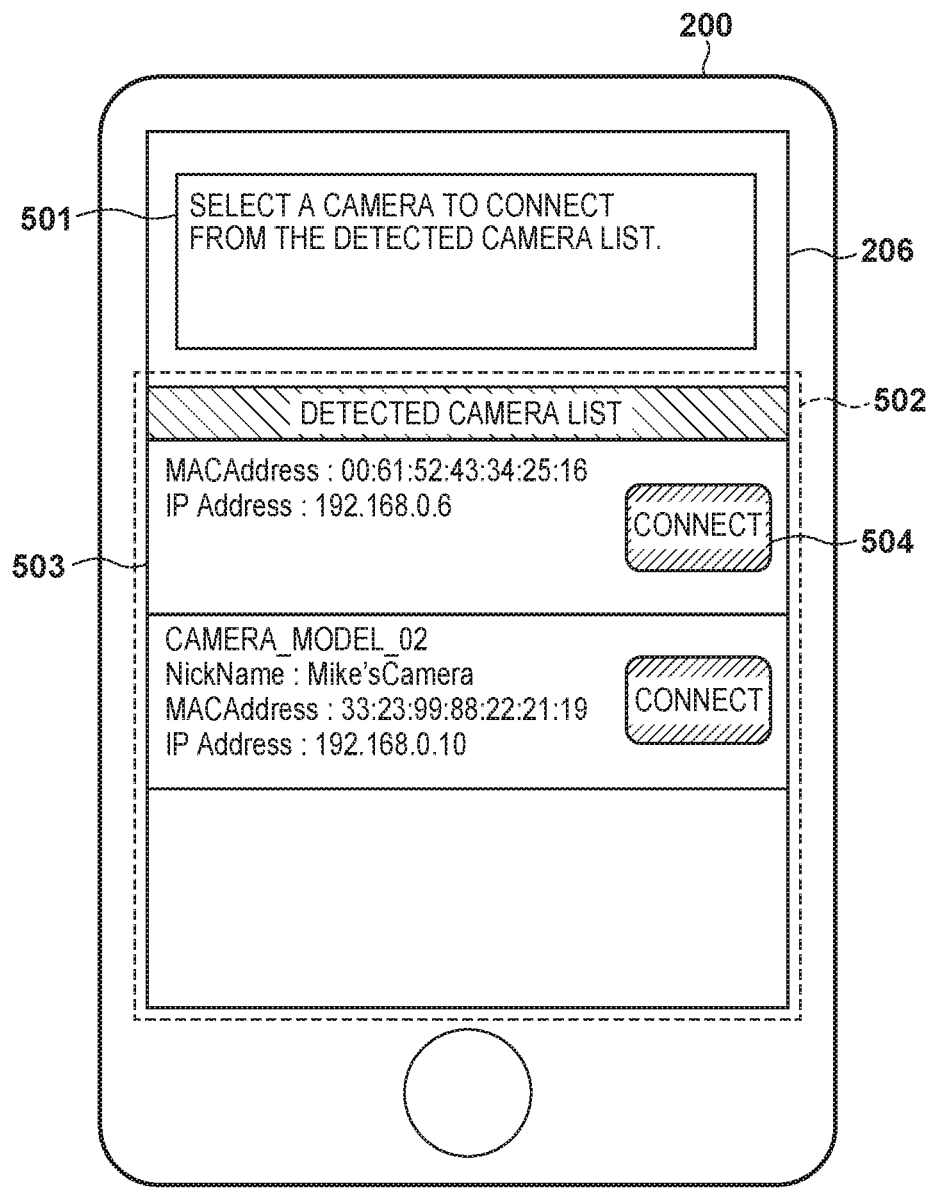
FIG. 5 is a diagram schematically illustrating an example of a display screen when establishing communication with an apparatus in infrastructure mode, carried out by the smartphone according to the embodiment.

FIG. 5 schematically illustrates an example of a screen when the control unit 201 has carried out the sequence of operations illustrated in FIG. 4A and the list of detected digital cameras is displayed in the display unit 206. Upon detecting the digital camera 100 by receiving a discovery signal, the control unit 201 displays a message prompting the user to select communication with the digital camera in a message display area 501. Additionally, the control unit 201 displays the detected digital cameras as a list in a list area 502 for displaying a list of the detected digital cameras.

Device information of each of the detected digital cameras, such as a model name, a nickname, a MAC address, and an IP address, is displayed in an information display area 503 for each digital camera. The displayed items are not limited to the items listed above, however, and all or some of information that can be obtained by the smartphone 200 using the discovery signal may be displayed. The control unit 201 also displays a select button 504 for accepting a command to establish communication between the smartphone 200 and the digital camera 100. The user can select the select button 504 using the touch panel included in the operation unit 205.

A sequence of operations involved in processing, carried out by the smartphone 200, for establishing communication with a digital camera 100 that has joined the same wireless LAN network will now be described with reference to FIG. 4B. This processing is started when the user presses the select button 504 in the screen of the smartphone 200 illustrated in FIG. 5.

In S451, the control unit 201 transmits a connection request to the digital camera 100. When the transmission of the connection request is complete, the control unit 201 starts a timer that measures a response time of a response to the connection request, and the processing then moves to S452. The transmitted connection request includes the model name of the smartphone 200.

In S452, the control unit 201 determines whether or not a response to the connection request transmitted in S451 has been received from the digital camera 100. If a response to the connection request has been received from the digital camera 100 via the wireless LAN communication unit 211, the control unit 201 moves the processing to S454. On the other hand, if the response to the connection request has not been received, the processing moves to S453. Note that the response to the connection request is transmitted from the digital camera 100 in S813 or S814, which will be described later.

In S453, the control unit 201 determines whether or not an amount of time greater than or equal to a predetermined timeout time has passed before the response to the connection request has been received. If it is determined that an amount of time greater than or equal to the predetermined timeout time has passed, the control unit 201 ends the processing for establishing communication between the smartphone 200 and the digital camera 100 (in other words, the sequence of operations illustrated in FIG. 4B). On the other hand, if the control unit 201 determines that an amount of time greater than or equal to the predetermined timeout time has not passed, the processing returns to S452, and the processing of S452 is repeated.

In S454, the control unit 201 determines whether the response to the connection request received from the digital camera 100 indicates that the connection is permitted or the connection is rejected. If the response to the received connection request indicates that the connection is permitted, the control unit 201 moves the processing to S455. On the other hand, if it is determined that the response to the received connection request indicates that the connection is rejected, the processing for establishing communication between the smartphone 200 and the digital camera 100 (in other words, the sequence of operations illustrated in FIG. 4B) is ended.

Figure 4B:
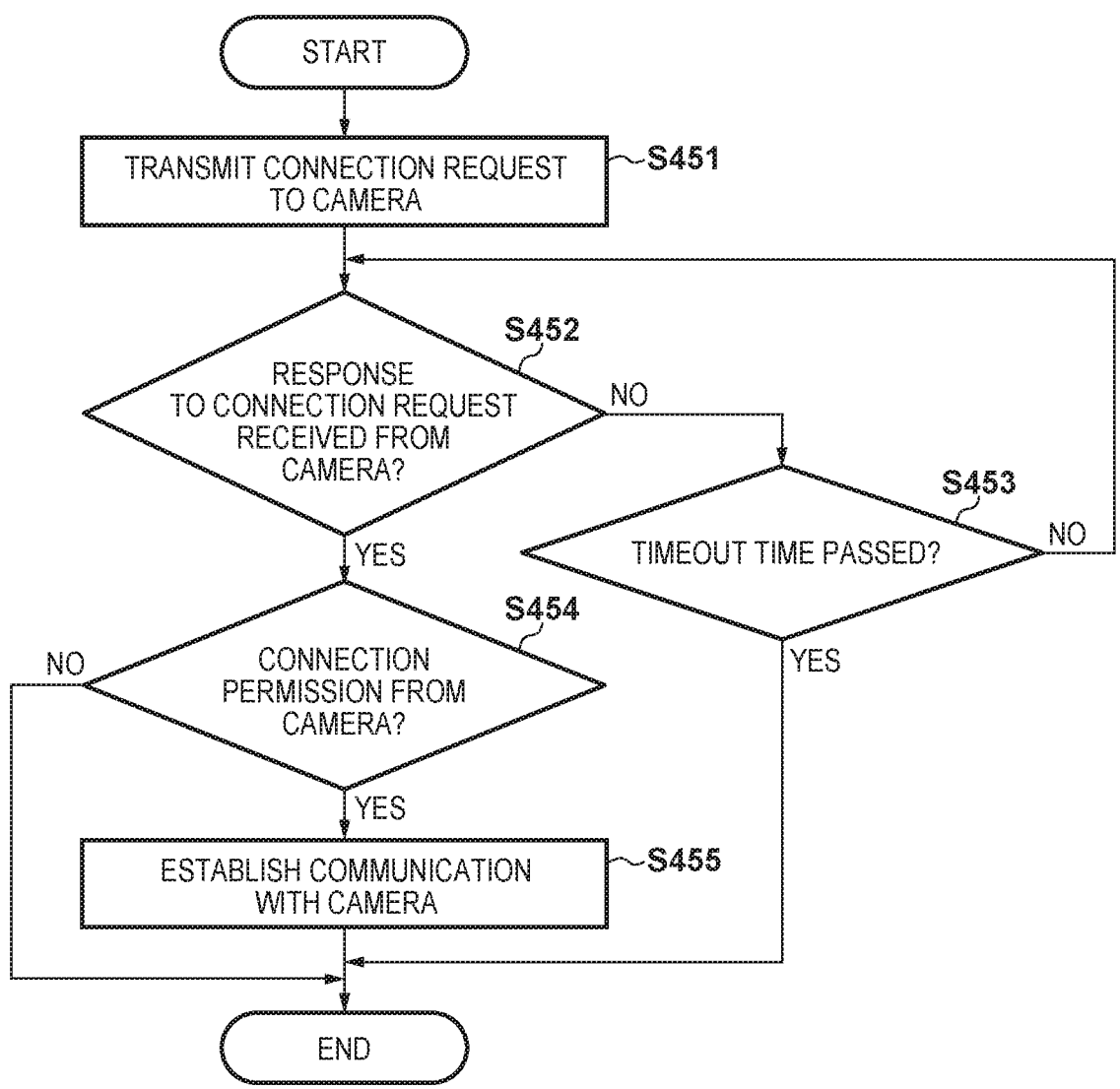

In S455, the control unit 201 establishes a connection with the digital camera 100 and ends the sequence of operations illustrated in FIG. 4B.

Sequence of Operations Involved in Processing Performed by Smartphone for Establishing Communication with Digital Camera in Simple AP Mode Processing performed by the smartphone 200 for establishing communication with the digital camera 100 in a connection format in which the digital camera 100 operates as a simple AP will be described next. In other words, this refers to the digital camera 100 and the smartphone 200 connecting to each other directly without using an external AP.

In this embodiment, the user can select whether or not to join the wireless LAN network formed by the digital camera 100 using a function of the OS or the like in the smartphone 200 even if the digital camera 100 is operating as a simple AP. In other words, communication can be established between the digital camera 100 in the simple AP mode and the smartphone 200 through similar processing as in the above-described operations for the digital camera 100 in infrastructure mode.

The following describes a situation where the smartphone 200 according to this embodiment identifies the wireless LAN network formed by the digital camera 100 operating as a simple AP by identifier and displays identified digital cameras as a list in a display screen. The user then establishes communication between the digital camera 100 and the smartphone 200 through similar operations as with a digital camera detected, using a discovery signal, on the wireless LAN network the smartphone 200 has already joined.

Figure 6A:
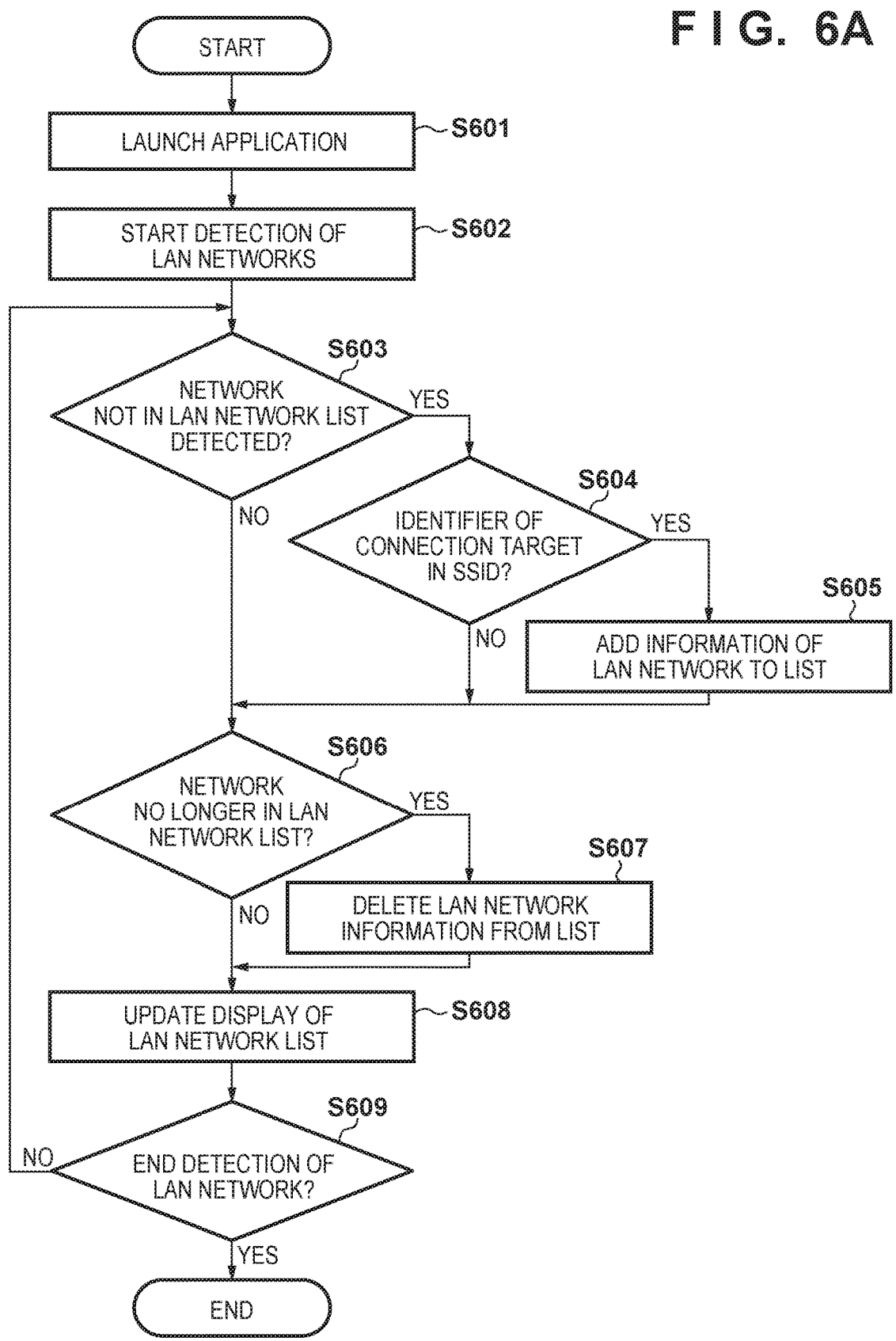
FIGS. 6A and 6B are flowcharts illustrating a sequence of operations involved in processing for establishing communication with an apparatus in simple AP mode, carried out by the smartphone according to the embodiment.

In the sequence of operations illustrated in FIG. 6A, the smartphone 200 detects a wireless LAN network having an SSID of "Camera_Canonet", which includes an identifier "Canonet", formed by the digital camera 100 operating as a simple AP. The smartphone 200 then adds information of the detected network to the list of detected digital cameras displayed in the display unit 206. Here, the identifier "Canonet", which is constituted by a specific character string, is an identifier added so that the smartphone 200 that has joined the network can identify the wireless LAN network as having been formed by an apparatus to be communicated with. The sequence of operations involved in this processing starts when the OS of the smartphone 200 has started up and the digital camera communication application can be launched.

In S601, the control unit 201 launches the digital camera communication application in response to the user selecting the digital camera communication application to be launched, after which the processing moves to S602.

In S602, the control unit 201 starts detecting a beacon signal of the wireless LAN network, after which the processing moves to S603. In S603, the control unit 201 determines whether a network not in a communication target network list has been detected. To be more specific, the control unit 201 refers to a list of network information of detected wireless LAN networks formed by apparatuses to be communicated with (the communication target network list). It is then determined whether or not the detected wireless LAN network is in the communication target network list. If the control unit 201 determines that a network not in the communication target network list has been detected, the processing moves to S604. On the other hand, if a network in the communication target network list has been detected, the processing moves to S606.

In S604, the control unit 201 determines whether or not the SSID contains the identifier "Canonet", which indicates that the wireless network has been formed by an apparatus to be communicated with. To be more specific, the control unit 201 refers to the SSID of the wireless LAN network detected in S603 (or in other words, a new wireless LAN network not in the communication target network list). Then, it is determined whether or not that SSID contains the identifier "Canonet", which indicates that the wireless LAN network has been formed by an apparatus to be communicated with. If the control unit 201 determines that the SSID contains the identifier indicating that the wireless network is a network formed by the apparatus to be communicated with, the processing moves to S605, whereas if the control unit 201 determines that the SSID does not contain the identifier, the processing moves to S606.

In S605, the control unit 201 adds the network information of the detected wireless LAN network to the communication target network list and stores a detected network list in the work memory 204, for example. The control unit 201 then moves the processing to S606.

In S606, the control unit 201 determines whether or not a wireless LAN network held in the communication target network list as a result of a previous detection is no longer detected. If the control unit 201 determines that a wireless LAN network held in the communication target network list is no longer detected, the processing moves to S607. On the other hand, if the control unit 201 determines that a wireless LAN network held in the communication target network list is detected, the processing moves to S608.

In S607, the control unit 201 deletes the network information of the wireless LAN network determined to no longer be detected in S606 from the communication target network list. The updated communication target network list is then stored in the work memory, for example. The control unit 201 then moves the processing to S608.

In S608, the control unit 201 displays or updates the list of digital cameras in the display unit 206 in accordance with the communication target network list, and then moves the processing to S609.

In S609, the control unit 201 determines whether to end the wireless LAN network detection processing. The control unit 201 ends the wireless LAN network detection processing when the user has selected the digital camera communication application to be terminated, when the user has selected the digital camera to communicate with, or the like, for example. If the control unit 201 has determined that the wireless LAN network detection processing is to be ended, the sequence of operations illustrated in FIG. 6A ends. On the other hand, if it is determined that the wireless LAN network detection processing is not to end, the processing returns to S603.

Figure 7:
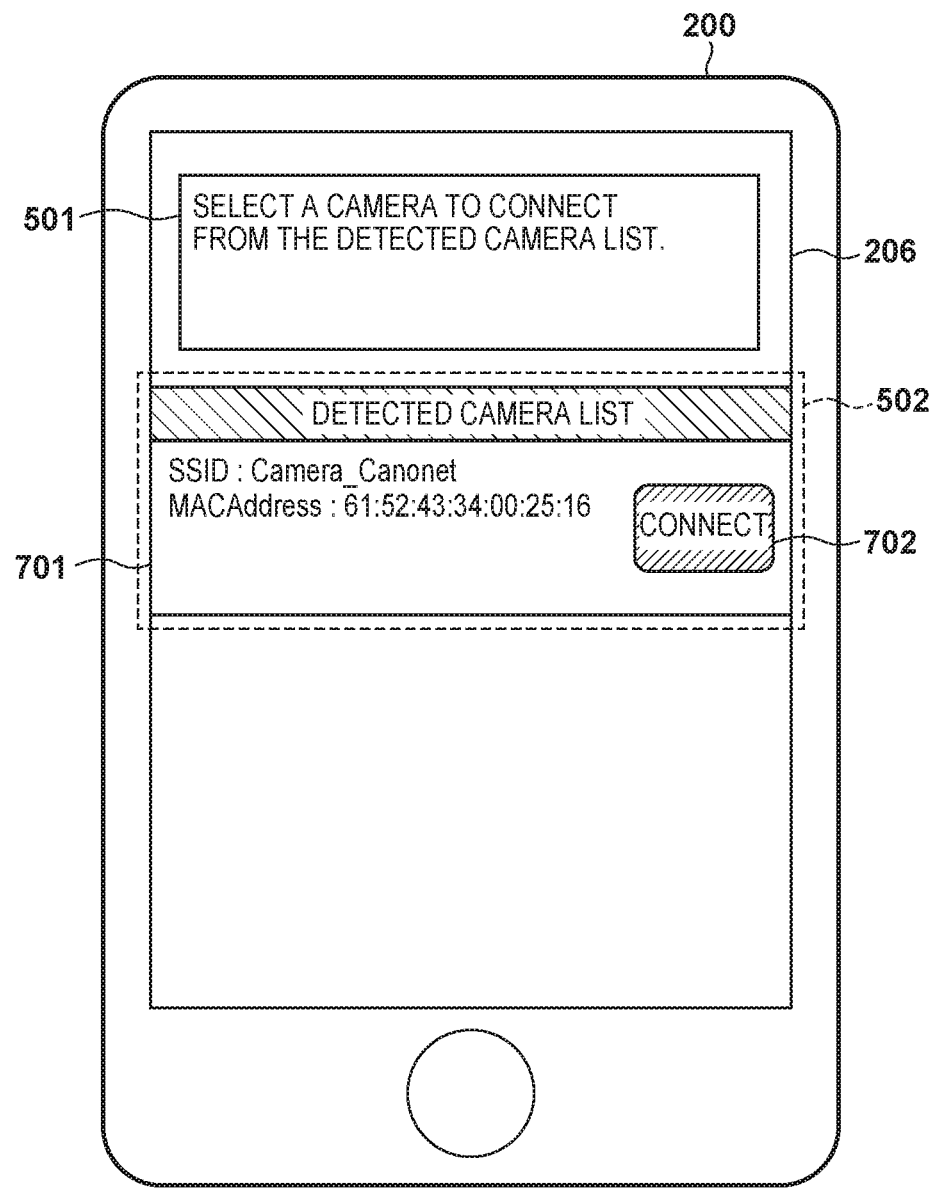
FIG. 7 is a diagram schematically illustrating an example of a display screen when establishing communication with an apparatus in simple AP mode, carried out by the smartphone according to the embodiment.

FIG. 7 schematically illustrates an example of a screen when the smartphone 200 has carried out the sequence of operations illustrated in FIG. 6A and the list of detected digital cameras is displayed in the display unit 206. Upon detecting the wireless LAN network containing the identifier "Canonet" in its SSID, generated by an apparatus that is to connect with the smartphone 200, the control unit 201 displays a message prompting communication with the digital camera to be selected in the message display area 501. Additionally, the control unit 201 displays a list of the network information of wireless LAN networks formed by apparatuses to be communicated with in the list area 502 that displays a list of the detected digital cameras. In other words, the network information of wireless LAN networks having SSIDs containing the identifier "Canonet" are displayed in the list area 502 that displays the detected digital cameras.

The control unit 201 displays the SSIDs, MAC addresses, and so on of the wireless LAN networks formed by digital cameras serving as apparatuses to be communicated with in an area 701 for displaying the information of the networks formed by the apparatuses to be communicated with. In the display example illustrated in FIG. 7, the wireless LAN network information of the digital camera 100 is displayed. The displayed items are not limited to the items listed above, however, and all or some of information that can be received by the smartphone 200 using the beacon signal may be displayed. The control unit 201 also displays a select button 702. The select button 702 is a button through which the smartphone 200 accepts a command to join the wireless LAN network of the digital camera 100 and establish communication with the digital camera 100. The user can select the select button 702 using the touch panel included in the operation unit 205.

A sequence of operations involved in processing, carried out by the smartphone 200, for establishing communication with a digital camera 100 that forms a wireless LAN network in simple AP mode will now be described with reference to FIG. 6B. To rephrase, this processing is processing through which the smartphone 200 joins a wireless LAN network formed by the digital camera 100 and establishes communication with the digital camera 100. Note that the sequence of operations involved in this processing is executed in a state in which the digital camera 100 operates as a simple AP and forms a wireless LAN network having an SSID of "Camera_Canonet", which contains the identifier "Canonet". The control unit 201 starts the processing when the select button 702 corresponding to the digital camera 100 is selected in the display screen of the smartphone 200 illustrated in FIG. 7.

In S651, the control unit 201 transmits a request to join the wireless LAN network formed by the digital camera 100. When the transmission of the request to join is complete, the control unit 201 starts a timer that measures a response time of a response to the request to join, and the processing then moves to S652.

In S652, the control unit 201 determines whether or not a response to the request to join transmitted in S651 has been received from the digital camera 100. If a response to the request to join has been received from the digital camera 100 via the wireless LAN communication unit 211, the control unit 201 moves the processing to S654. On the other hand, if a response to the request to join has not been received, the processing moves to S653. Note that the response to the request to join is transmitted from the digital camera 100 in S807 or S808, which will be described later.

In S653, the control unit 201 determines whether or not an amount of time greater than or equal to a predetermined timeout time has passed before the response to the request to join has been received. If it is determined that an amount of time greater than or equal to the predetermined timeout time has passed, the control unit 201 ends the processing for establishing communication between the smartphone 200 and the digital camera 100 (in other words, the sequence of operations illustrated in FIG. 6B). On the other hand, if the control unit 201 determines that an amount of time greater than or equal to the predetermined timeout time has not passed, the processing returns to S652.

In S654, the control unit 201 determines whether the response to the request to join received from the digital camera 100 indicates that the joining is permitted or the joining is rejected. If the response to the received request to join indicates that the joining is permitted, the control unit 201 moves the processing to S655. On the other hand, if it is determined that the response to the received request to join indicates that the joining is rejected, the processing for establishing communication between the smartphone 200 and the digital camera 100 (in other words, the sequence of operations illustrated in FIG. 6B) is ended.

In S655, the control unit 201 joins the wireless LAN network formed by the digital camera 100, after which the processing moves to S656. In S656, the control unit 201 starts the detection of the discovery signal from the digital camera 100 by controlling the wireless LAN communication unit 211, after which the processing moves to S657.

In S657, the control unit 201 determines whether or not the device information of the digital camera 100 has been detected as a discovery signal via the wireless LAN communication unit 211. If it is determined that the information has been detected, the processing moves to S658. If the information has not been detected, S657 is repeated. The discovery signal is broadcast from the digital camera 100 in S809, which will be described later.

In S658, the control unit 201 transmits a connection request to the digital camera 100 on the basis of the device information contained in the discovery signal detected in S657. The control unit 201 starts a timer that measures a response time of a response to the connection request, and the processing then moves to S659. The transmitted connection request includes the device name of the smartphone 200.

In S659, the control unit 201 determines whether or not a response to the connection request has been received from the digital camera 100. If a response to the connection request has been received from the digital camera 100 via the wireless LAN communication unit 211, the control unit 201 moves the processing to S661. On the other hand, if a response to the connection request has not been received, the processing moves to S660. Note that the response to the connection request is transmitted from the digital camera 100 in S813 or S814.

In S660, the control unit 201 determines whether or not an amount of time greater than or equal to a predetermined timeout time has passed before the response to the connection request has been received. If it is determined that an amount of time greater than or equal to the predetermined timeout time has passed, the control unit 201 ends the processing for establishing communication between the smartphone 200 and the digital camera 100 (in other words, the sequence of operations illustrated in FIG. 6B). On the other hand, if the control unit 201 determines that an amount of time greater than or equal to the predetermined timeout time has not passed, the processing returns to S659.

In S661, the control unit 201 determines whether the response to the connection request received from the digital camera 100 indicates that the connection is permitted or the connection is rejected. If the response to the received connection request indicates that the connection is permitted, the control unit 201 moves the processing to S662. On the other hand, if it is determined that the response to the received connection request indicates that the connection is rejected, the processing for establishing communication between the smartphone 200 and the digital camera 100 (in other words, the sequence of operations illustrated in FIG. 6B) is ended.

Figure 6B:
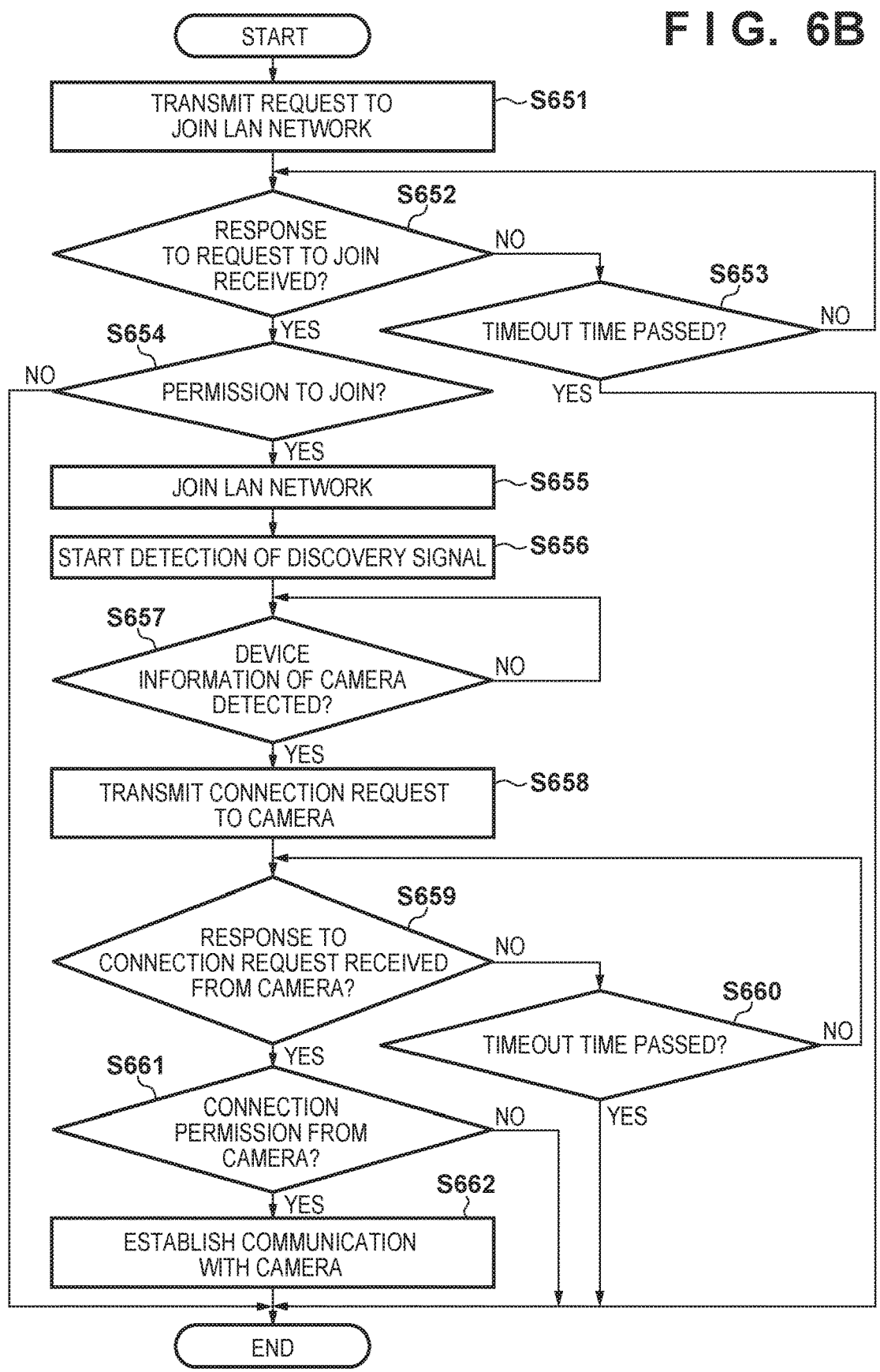

In S662, the control unit 201 establishes communication with the digital camera 100 and ends the sequence of operations illustrated in FIG. 6B.

The foregoing has described processes carried out by the smartphone 200 in two connection formats, namely a connection format in which communication is established over a network formed by an external AP, and a connection format in which communication is established over a network formed by the digital camera 100.

Figure 8:
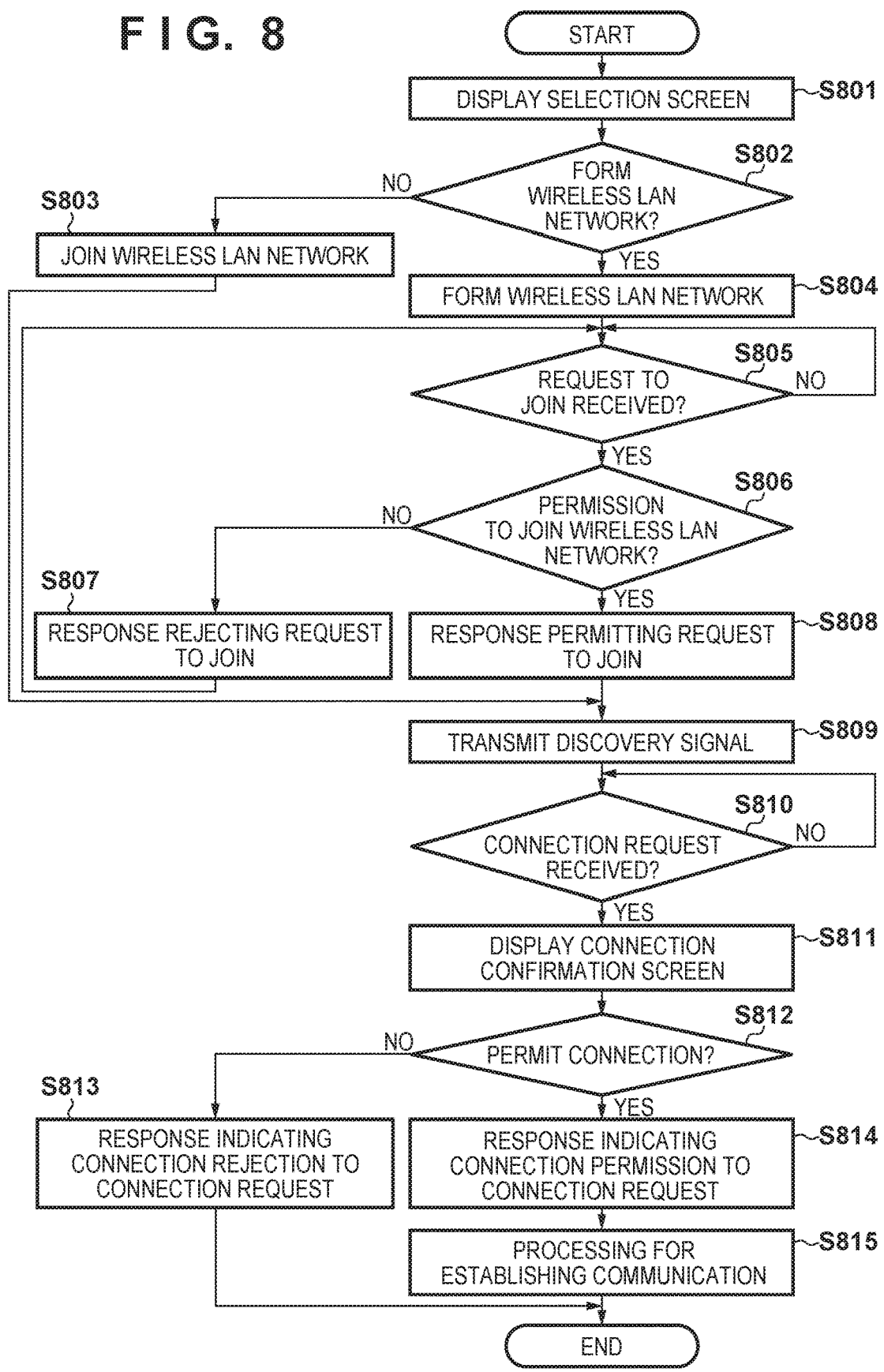
FIG. 8 is a flowchart illustrating a sequence of operations involved in processing for establishing communication with another apparatus, carried out by the digital camera according to the embodiment.

A sequence of operations involved in processing carried out by the digital camera 100, corresponding to the above-described processing carried out by the smartphone 200, will be described next with reference to FIG. 8. Note that the sequence of operations involved in this processing is realized by the control unit 101 loading a program stored in the non-volatile memory 103 into the work memory 104 and executing the program. Unless otherwise specified, the same applies to the descriptions of other operations indicating processing performed by the digital camera 100. This processing is started when, for example, a user of the digital camera 100 instructs a connection to be made with an external apparatus by manipulating a menu or the like included in the operation unit 105.

In S801, the control unit 101 displays a selection screen in the display unit 106. This selection screen is a screen for allowing the user to select whether to communicate in simple AP mode or in infrastructure mode. Upon one of these options being selected through user operations, the control unit 101 moves the processing to S802.

In S802, the control unit 101 determines whether to form a wireless LAN network in accordance with the result of the selection made by the user in S801. For example, if communication in infrastructure mode has been selected by the user, the digital camera 100 will join a wireless LAN network rather than forming a wireless LAN network itself, and thus the control unit 101 moves the processing to S803. On the other hand, if communication in simple AP mode is selected, the digital camera 100 itself functions as a simple AP and forms a wireless LAN network, and thus the control unit 101 moves the processing to S804.

In S803, the control unit 101 detects a nearby wireless LAN network and carries out processing for connecting to an external AP. At this time, the control unit 101 may accept an SSID and an encryption key for the external AP from the user via the operation unit 105. Furthermore, an IP address is allocated and subnet configurations are made to enable communication with other apparatuses, after which the processing moves to S809.

On the other hand, in S804, the control unit 101 forms a wireless LAN network as a simple AP. To be more specific, the control unit 101 generates an SSID, a BSSID, an authentication method, an encryption type, and an encryption key required for the formation of a network. An SSID containing the identifier "Canonet", which indicates that the network has been generated by an apparatus with which the smartphone 200 is to connect, is generated as the SSID at this time.

Additionally, the control unit 101 displays at least the SSID and the encryption key in the display unit 106 as information necessary for the connecting apparatus to join the network. The encryption key and the SSID may be generated for each connection or each connecting apparatus, or may always be the same. The control unit 101 furthermore allocates an IP address and makes subnet configurations to enable communication with other devices, after which the processing moves to S805.

In S805, the control unit 101 determines whether a request to join the wireless LAN network formed by the digital camera 100 has been received from the smartphone 200. This request to join is transmitted from the smartphone 200 in S651, described above. The control unit 101 repeats this step until the request to join the wireless LAN network formed by the digital camera 100 is received. The processing moves to S806 if it is determined that the request to join has been received.

In S806, the control unit 101 determines whether or not to permit the smartphone 200 to join the wireless LAN network in response to the request to join received in S805 (from the smartphone 200, for example) To be more specific, the control unit 101 determines whether the encryption key received in the request to join is correct, permits the smartphone 200 to join if the encryption key is determined to be correct, and moves the processing to S808. On the other hand, if it is determined that the encryption key is not correct, the control unit 101 rejects the smartphone 200 joining the network and moves the processing to S807.

In S807, the control unit 101 transmits, to the smartphone 200, a response indicating the rejection of joining the wireless LAN network, and returns the processing to S805. On the other hand, in S808, the control unit 101 transmits, to the smartphone 200, a response indicating the permission to join the wireless LAN network. By receiving this response, the smartphone 200 can join the wireless LAN network formed by the digital camera 100. Note that once the processing of S803 or S808 ends, the digital camera 100 and the smartphone 200 have joined the same wireless LAN network. The processing from S809 is processing for establishing communication between the digital camera 100 and the smartphone 200 that have joined the same wireless LAN network.

In S809, the control unit 101 transmits a discovery signal to apparatuses on the same wireless LAN network, and then moves to S810. The discovery signal includes device information of the digital camera 100, such as the model name, names of functions the digital camera 100 can handle, and so on. This discovery signal is received by the smartphone 200 in S403 or S657.

In S810, the control unit 101 determines whether or not a connection request has been received from an external apparatus. If the connection request has been received, the control unit 101 moves the processing to S811. On the other hand, if the connection request has not been received, the process returns to S810, where the control unit 101 waits for receiving the connection request. The connection request received by the digital camera 100 is transmitted from the smartphone 200 in S451 or S658.

In S811, the control unit 101 displays a connection confirmation screen in the display unit 106. The connection confirmation screen displays a name of a transmitting origin apparatus that transmitted the connection request received in S810 (an apparatus name of the smartphone 200) and a button for the user to select whether to permit or reject a connection to the transmission source apparatus, for example. When the user selects permitting or rejecting the connection through the operation unit 105, the control unit 101 moves the processing to S812.

In S812, the control unit 101 determines whether or not the user has selected permitting the connection. If the control unit 101 determines that permitting the connection has been selected on the basis of, for example, a position of contact with the touch panel included in the operation unit 105, the processing moves to S814. On the other hand, if it is determined that rejecting the connection has been selected, the processing moves to S813.

In S813, the control unit 101 transmits a response rejecting the connection request to the smartphone 200, which is the transmitting origin apparatus that transmitted the connection request, and ends the sequence of operations involved in this processing. On the other hand, in S814, the control unit 101 transmits a response permitting the connection request to the smartphone 200, which is the transmitting origin apparatus that transmitted the connection request, and moves the processing to S815. Then, in S815, the control unit 101 establishes communication with the smartphone 200, and ends the sequence of operations.

Processing for Displaying List of Digital Cameras in Smartphone when Detecting Digital Cameras Having Different Connection Formats The foregoing has described, as a first connection format, a situation in which the digital camera 100 operating in infrastructure mode and the smartphone 200 establish communication having joined a wireless LAN network formed by an external AP. The foregoing has also described, as a second connection format, a situation in which the digital camera 100 operating in simple AP mode forms a wireless LAN network, and the smartphone 200 joins that network and establishes communication with the digital camera 100.

Here, the smartphone 200 sometimes carries out the processing for detecting digital cameras that can be communicated with according to these two connection formats in parallel. For example, a user who has the digital camera 100 and the smartphone 200 further possesses an external AP 900, and the smartphone 200 and the digital camera 100 in infrastructure mode join the wireless LAN network formed by the external AP 900. At this time, if a digital camera 190 operating in simple AP mode, possessed by a different user, forms a wireless LAN network, the smartphone 200 will require different connection formats for each of the digital cameras. In other words, it is necessary to detect the digital camera 100 and the digital camera 190 using separate detection methods.

Figure 9A:
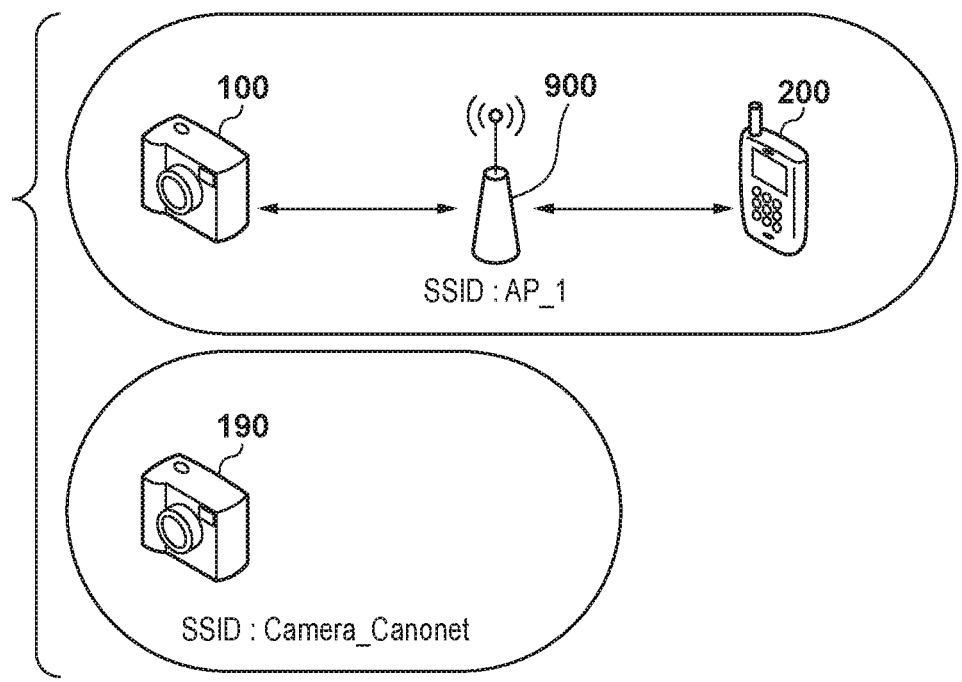
FIGS. 9A and 9B are diagrams schematically illustrating the configuration of a network formed by the digital camera and the smartphone according to an embodiment.
Figure 9B:
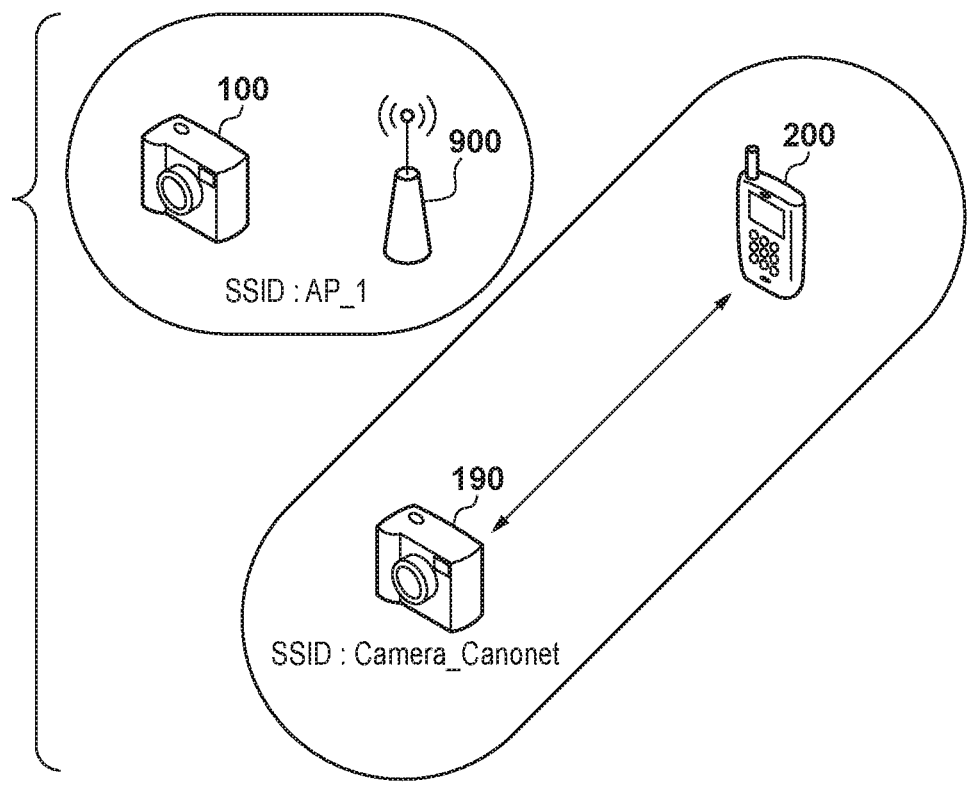

FIGS. 9A and 9B schematically illustrate detection results obtained by detecting digital cameras that can be communicated with according to different connection formats in parallel as described above. In other words, FIGS. 9A and 9B illustrate a format for connecting to the digital camera 100 that transmits a discovery signal over a wireless LAN network formed by the external AP 900, and a format for connecting to the digital camera 190 that forms a wireless LAN network by operating as a simple AP.

Specifically, FIG. 9A illustrates a state where the digital camera 100 and the smartphone 200 join a wireless LAN network "AP_1" formed by the external AP 900, and the smartphone 200 detects the digital camera 100 by receiving a discovery signal. In this state, the smartphone 200 detects the wireless LAN network formed by the digital camera 190 operating as a simple AP (or in other words, the smartphone 200 does not join the network "Camera_Canonet").

When, in the state illustrated in FIG. 9A, the user selects the digital camera 190 as an apparatus with which to establish communication, the smartphone 200 enters a state of establishing communication with the digital camera 190 (FIG. 9B). Thus even if different connection methods are required but the user of the smartphone 200 wishes to exchange data with both digital cameras in this manner, it is desirable that communication with the desired digital camera can be established through the same operations on the same screen.

A method of display in the smartphone 200 for a user to establish communication with the desired digital camera using the same screen and the same operations when digital cameras having different connection formats have been detected, regardless of those connection formats, will be described next with reference to FIGS. 10A to 10D.

Figure 10A:
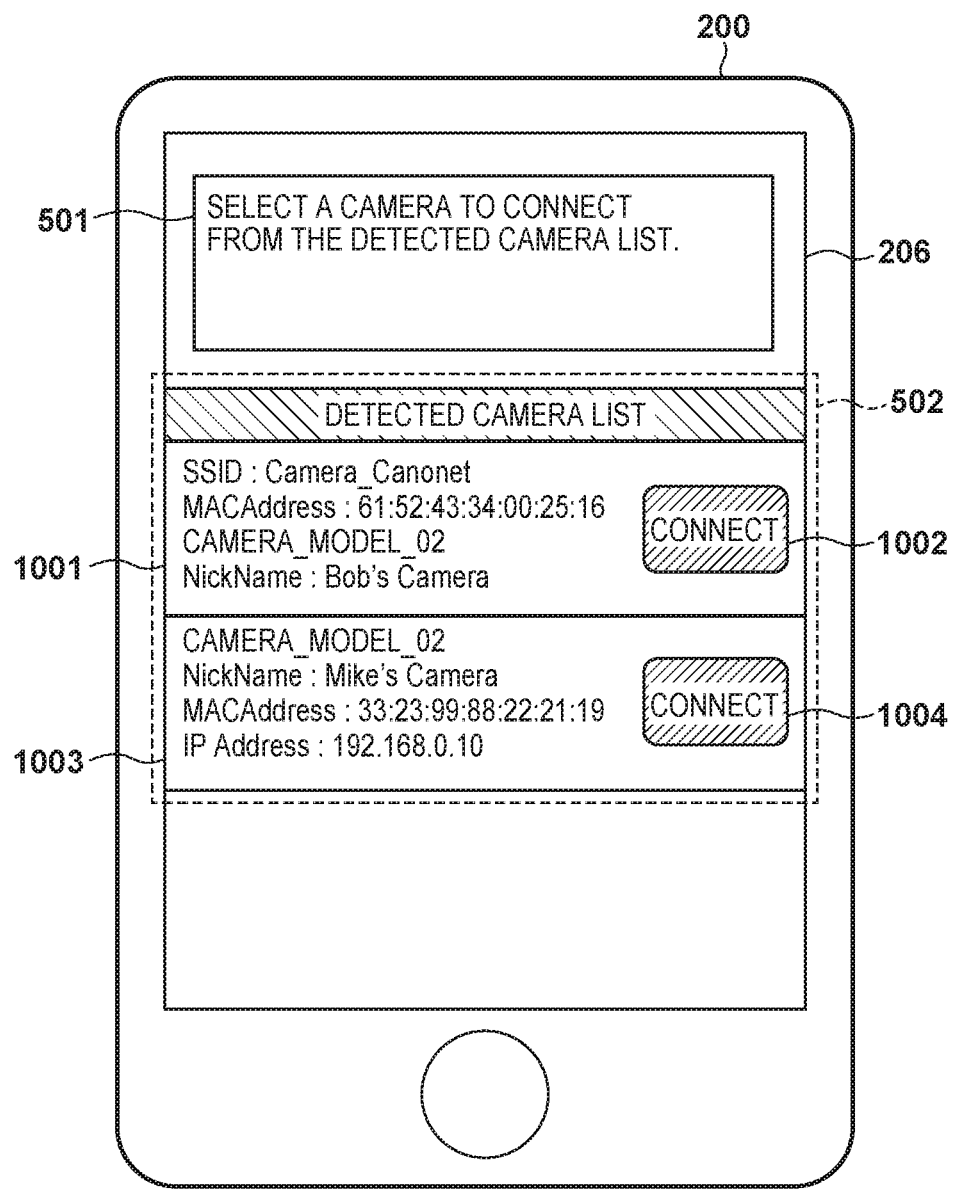

FIG. 10A illustrates an example in which camera information of the digital camera 100 and network information of the digital camera 190 are displayed in the same list in the list area 502 of the display unit 206. The camera information of the digital camera 100 is camera information, detected in S403, of the digital camera 100 detected using a discovery signal on the wireless LAN network the digital camera 100 has joined. The network information of the digital camera 190 is network information of the digital camera 190 operating in simple AP mode, detected as the wireless LAN network in S602.

A digital camera information display area 1001 displays the network information of the digital camera 190 indicated in FIG. 9A. A select button 1002 is a button for accepting a command to establish communication between the smartphone 200 and the digital camera 190. When the select button 1002 is selected by the user, the control unit 201 starts the operations illustrated in FIG. 6B, joins the wireless LAN network formed by the digital camera 190, and establishes communication with the digital camera 190.

On the other hand, a digital camera information display area 1003 displays the camera information of the digital camera 100 indicated in FIG. 9A. A select button 1004 is a button for accepting a command to establish communication between the smartphone 200 and the digital camera 100. When the select button 1004 is selected by the user, the control unit 201 starts the operations illustrated in FIG. 4B, and establishes communication with the digital camera 100.

In this manner, the network information of the digital camera 190 and the camera information of the digital camera 100 are displayed in the same list, and the processing leading up to communication being established is switched in accordance with the connection format of the selected digital camera. By doing so, the user of the smartphone 200 can easily establish communication with each digital camera by carrying out the same operations in the same screen, without concern for the connection formats of the digital cameras.

Meanwhile, on the digital camera side, a user can set the connection format as desired, and thus there are cases where a user having knowledge of the connection formats wishes to specify a specific connection format and display only the information of digital cameras that connect to a smartphone through the connection format. Accordingly, rather than displaying the discovered digital cameras so as not to be divided on the basis of the two connection formats, it is also possible to additionally display the connection formats separate from each other.

Figure 10C:
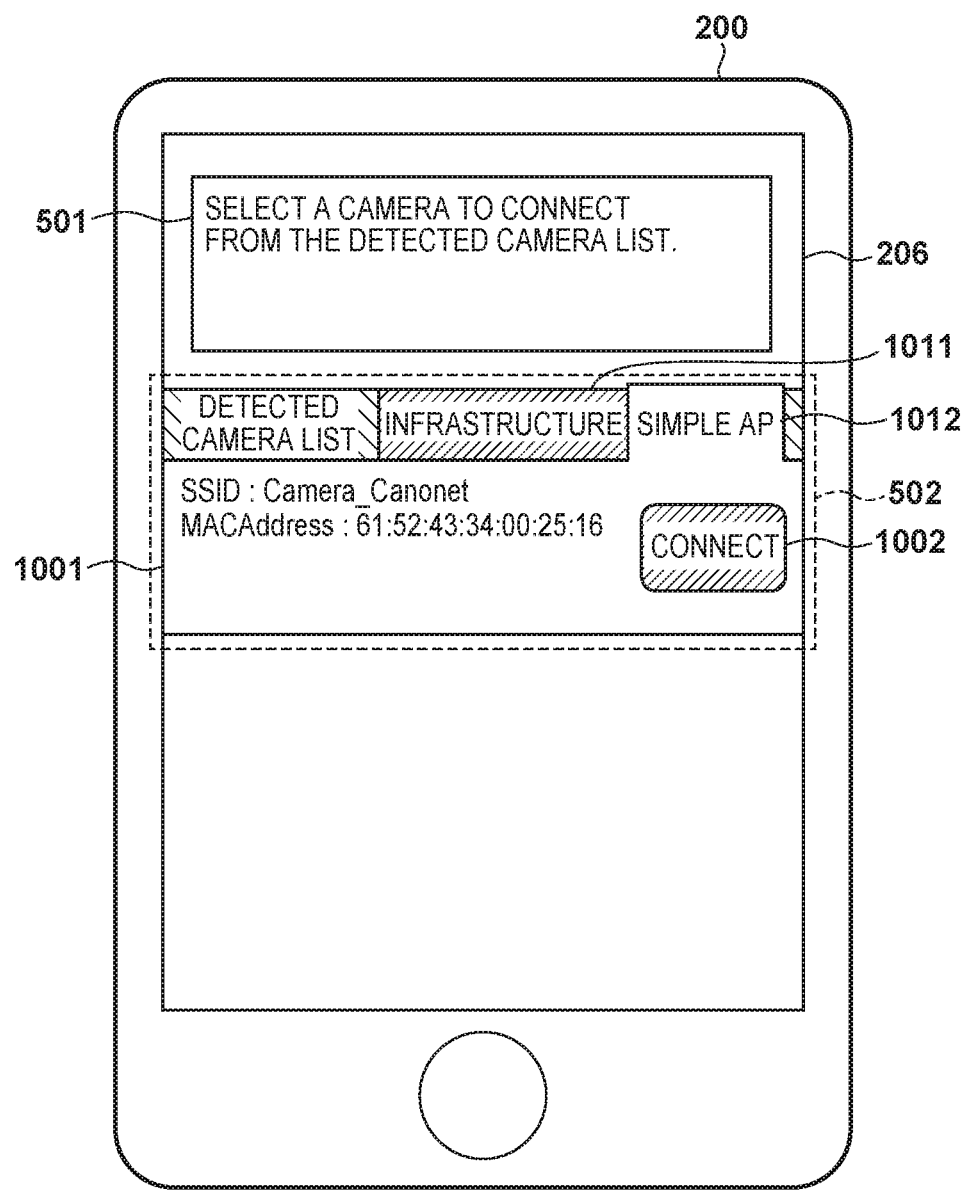

For example, information in an information display area of digital cameras discovered by the identifier for the wireless LAN network and information in an information display area of digital cameras discovered by detecting the discovery signals may be distinguished by background color, text color, text size, or the like. Additionally, a sort button may be provided in the list so that the order of the information in the information display area can be switched to the order in which the digital cameras were discovered. Furthermore, the information in the information display area in the list may be switched using tabs according to the connection formats of the digital camera. FIGS. 10B and 10C illustrate examples of displays in which the information display area is not divided on the basis of connection format, but in which the connection formats can be switched using tabs.

As illustrated in FIG. 10B, when an infrastructure connection tab button 1011 is selected, the control unit 201 displays only digital cameras detected by receiving discovery signals on the wireless LAN network formed by the external AP ("AP_1"). In other words, the device information of the digital camera 100 is displayed in the information display area 1003, and the select button 1004 for selecting a connection with the digital camera 100 is displayed.

On the other hand, as illustrated in FIG. 10C, when a simple AP connection tab button 1012 is selected, the control unit 201 displays only digital cameras providing an identifier indicating a wireless LAN network formed by the apparatus to be connected to, obtained by beacon signal. In other words, the device information of the digital camera 190 is displayed in the information display area 1001, and the select button 1002 for selecting a connection with the digital camera 190 is displayed. By carrying out the display according to the connection format in this manner, a user can easily browse and search for digital cameras on the basis of the connection format, in accordance with the level of the user's knowledge with respect to connection formats.

Incidentally, external APs that are typically used have lines for connecting to public networks and the like, and are capable of communication over the internet and so on. On the other hand, with wireless LAN networks formed by a simple AP function of the digital camera as described above, there is typically no line for connecting to a public network or the like. As such, in a state where, for example, the smartphone 200 has joined the wireless LAN network of the external AP 900 illustrated in FIG. 9A, the smartphone 200 can communicate over the internet. If in this state the wireless LAN network the smartphone 200 has joined is changed to the network formed by the digital camera 190 as illustrated in FIG. 9B, the smartphone 200 can no longer communicate over the internet. More generally, when using connection formats for different purposes (in other words, when using APs providing different functions), there are cases where limitations or problems arise in the functions that can be provided to the user, and it is therefore useful to prompt the user to pay attention during operations for selecting a network.

For example, when the smartphone 200 joins a wireless LAN network formed by digital camera in simple AP mode, the control unit 201 may display, in the display unit 106, a message indicating that the smartphone 200 will no longer be able to connect to the internet. FIG. 10D illustrates an example of the display of this message. If communication with the digital camera 190 that forms the wireless LAN network having an SSID containing the identifier "Canonet" has been selected, the control unit 201 displays a warning message dialog 1021. The warning message dialog 1021 displays a warning indicating that the smartphone 200 will no longer be able to connect to the internet, for example. An OK button 1022 is a button for acknowledging that the smartphone 200 will no longer be able to connect to the internet. When the OK button 1022 is pressed, the control unit 201 continues the processing for joining the wireless LAN network formed by the digital camera 190 and the processing for establishing communication with the digital camera 190. Meanwhile, a cancel button 1023 is a button for allowing the user to select a rejection for the smartphone 200 becoming unable to connect the internet. If the cancel button 1023 is selected, the smartphone 200 carries out neither the processing for joining the wireless LAN network formed by the digital camera 190, nor the processing for establishing communication with the digital camera 190. This makes it possible to prevent problems from arising when the user is unaware of the differences in the functions of APs with which connections can be made.

According to the embodiment described thus far, when a digital camera with which communication is to be established is selected, digital cameras having different connection formats are displayed in the same display screen. In other words, a digital camera detected by beacon signal and a digital camera discovered by discovery signal over a wireless network are displayed in the same display screen without distinction between the two. This makes it possible to display multiple apparatuses detected using different methods in a uniform manner for establishing communication. Additionally, operations can be carried out without any distinction between the digital cameras in the same display screen. This makes it possible for the user to easily select and operate the desired digital camera, without concern for the different connection formats of the digital cameras. Furthermore, in addition to a display that does not make distinctions between the connection formats, a list of digital cameras can also be displayed on the basis of the different connection formats. This makes it possible for a user to easily select only a digital camera having the desired connection format if the user has knowledge of connection formats. Additionally, when multiple wireless LAN connections having different connection formats are present and functions will be limited by the selected wireless LAN network, a warning message is displayed. This makes it possible to prevent problems from arising when the user is unaware of the differences in the functions of APs with which connections can be made.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-007879, filed Jan. 19, 2017, which is hereby incorporated by reference herein in its entirety.

What is claimed is:

1. A communication apparatus that can establish predetermined communication with another apparatus present on the same network, the communication apparatus comprising:
   a communication interface; and
   a processor configured to perform the operations of following units:
   while the communication apparatus has joined a first network,
   a first receiving unit configured to receive, via the communication interface, a first signal, the first signal being transmitted from a first external apparatus that has joined the first network and the first signal including information pertaining to the first external apparatus;
   a second receiving unit configured to receive, via the communication interface, a second signal, the second signal including information of a second network formed by a second external apparatus;
   a determining unit configured to determine whether the second external apparatus meets a predetermined condition on the basis of the information of the second network received by the second receiving unit; and
   a display control unit configured to display, in a display unit, a selection screen for selecting an apparatus with which to establish the predetermined communication,
   wherein the display control unit displays the information of the first external apparatus and the information of the second external apparatus determined to meet the predetermined condition in the selection screen as information of candidate apparatuses with which the predetermined communication may be established.

2. The communication apparatus according to claim 1, the processor further configured to perform the operation of a control unit configured to control the communication interface to establish the predetermined communication with the first external apparatus over the first network in a case where the information of the first external apparatus has been selected in the selection screen, and to join the second network and establish the predetermined communication with the second external apparatus over the second network in a case where the information of the second external apparatus has been selected in the selection screen.

3. The communication apparatus according to claim 2, the processor further configured to perform the operation of a third receiving unit configured to receive a third signal for discovering an apparatus on the second network, the third signal being transmitted from the second external apparatus, in a case where the information of the second external apparatus has been selected in the selection screen and the communication apparatus has joined the second network.

4. The communication apparatus according to claim 1, wherein the selection screen includes an operation unit configured to select information of the candidate apparatuses through a user operation.

5. The communication apparatus according to claim 4, wherein the operation unit is displayed for each piece of information of the candidate apparatuses.

6. The communication apparatus according to claim 5, wherein an operation unit for selecting the information of the first external apparatus and an operation unit for selecting the information of the second external apparatus have the same design.

7. The communication apparatus according to claim 1, wherein the display control unit displays the information of the candidate apparatuses as a list in the selection screen.

8. The communication apparatus according to claim 7, wherein the display control unit determines an order of the information of the candidate apparatuses in the selection screen on the basis of an order in which the first signal and the second signal have been received.

9. The communication apparatus according to claim 1, wherein the display control unit displays the information of the first external apparatus and the information of the second external apparatus determined to meet the predetermined condition such that the pieces of information can be distinguished from each other.

10. The communication apparatus according to claim 9, wherein the display control unit displays the information of the first external apparatus and the information of the second external apparatus such that at least one of at least part of a color in a display region, a text color, and a text size are different.

11. The communication apparatus according to claim 1, wherein the display control unit switches the display of the information of the first external apparatus and the information of the second external apparatus in the selection screen on the basis of a user operation.

12. The communication apparatus according to claim 1, wherein the display control unit displays a notification pertaining to a function limitation of the second network in a case where the information of the second external apparatus has been selected.

13. The communication apparatus according to claim 1, wherein the information of the second network is a beacon signal; and
   wherein the determining unit specifies the information of the second external apparatus on the basis of information included in the beacon signal.

14. The communication apparatus according to claim 1, wherein the determining unit determines whether a network identifier included in the information of the second network contains a specific character string; and
   in a case where it is determined that the network identifier contains the specific character string, the determining unit determines that the second external apparatus meets the predetermined condition.

15. A control method of a communication apparatus that can establish predetermined communication with another apparatus present on the same network, the method comprising:
- while the communication apparatus has joined a first network,
- receiving, via the communication interface, a first signal, the first signal being transmitted from a first external apparatus that has joined the first network and the first signal including information pertaining to the first external apparatus;
- receiving, via the communication interface, a second signal, the second signal including information of a second network formed by a second external apparatus;
- determining whether the second external apparatus meets a predetermined condition on the basis of the received information of the second network; and
- displaying, in a display unit, a selection screen for selecting an apparatus with which to establish the predetermined communication,
- wherein in the step of displaying, the information of the first external apparatus and the information of the second external apparatus determined to meet the predetermined condition are displayed in the selection screen as information of candidate apparatuses with which the predetermined communication may be established.

16. A non-transitory computer readable storage medium storing a program for causing a computer to execute a control method of a communication apparatus that can establish predetermined communication with another apparatus present on the same network, the method comprising:
- while the communication apparatus has joined a first network,
- receiving, via the communication interface, a first signal, the first signal being transmitted from a first external apparatus that has joined the first network and the first signal including information pertaining to the first external apparatus;
- receiving, via the communication interface, a second signal, the second signal including information of a second network formed by a second external apparatus;
- determining whether the second external apparatus meets a predetermined condition on the basis of the received information of the second network; and
- displaying, in a display unit, a selection screen for selecting an apparatus with which to establish the predetermined communication,
- wherein in the step of displaying, the information of the first external apparatus and the information of the second external apparatus determined to meet the predetermined condition are displayed in the selection screen as information of candidate apparatuses with which the predetermined communication may be established.

* * * * *